(12) United States Patent
Mowatt et al.

(10) Patent No.: US 7,949,536 B2
(45) Date of Patent: May 24, 2011

(54) INTELLIGENT SPEECH RECOGNITION OF INCOMPLETE PHRASES

(75) Inventors: David Mowatt, Seattle, WA (US); Ricky Loynd, Redmond, WA (US); Robert Edward Dewar, Bellevue, WA (US); Rachel Imogen Morton, Seattle, WA (US); Qiang Wu, Sammamish, WA (US); Robert Ian Brown, Kirkland, WA (US); Michael D. Plumpe, Sammamish, WA (US); Philipp Heinz Schmid, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 11/513,772

(22) Filed: Aug. 31, 2006

(65) Prior Publication Data

US 2008/0059186 A1  Mar. 6, 2008

(51) Int. Cl.
  *G10L 21/00* (2006.01)
(52) U.S. Cl. .......... 704/275; 704/254; 704/257
(58) Field of Classification Search ........... 704/9, 251, 704/257, 270, 275, 1, 3, 4, 8, 10, 252, 254, 704/271
  See application file for complete search history.

(56) References Cited

U.S. PATENT DOCUMENTS

| | | | | |
|---|---|---|---|---|
| 5,428,707 A * | 6/1995 | Gould et al. | | 704/231 |
| 5,652,897 A | 7/1997 | Linebarger et al. | | |
| 5,805,775 A * | 9/1998 | Eberman et al. | | 704/257 |
| 5,826,233 A * | 10/1998 | Matsumoto | | 704/275 |
| 6,064,959 A | 5/2000 | Young et al. | | |
| 6,125,342 A | 9/2000 | Selesky | | |
| 6,138,098 A | 10/2000 | Shieber et al. | | |
| 6,233,559 B1 * | 5/2001 | Balakrishnan | | 704/275 |
| 6,278,975 B1 * | 8/2001 | Brant et al. | | 704/275 |
| 6,308,157 B1 * | 10/2001 | Vanbuskirk et al. | | 704/275 |
| 6,374,226 B1 | 4/2002 | Hunt et al. | | |
| 6,477,500 B2 * | 11/2002 | Maes | | 704/275 |
| 6,601,027 B1 * | 7/2003 | Wright et al. | | 704/275 |
| 6,801,897 B2 | 10/2004 | Kist et al. | | |
| 6,836,760 B1 | 12/2004 | Bellegarda et al. | | |
| 6,895,380 B2 | 5/2005 | Sepe, Jr. | | |
| 6,975,993 B1 * | 12/2005 | Keiller | | 704/275 |
| 7,027,991 B2 | 4/2006 | Alexander et al. | | |

(Continued)

FOREIGN PATENT DOCUMENTS

WO  WO 02093342 A2  11/2002

OTHER PUBLICATIONS

"Dragon NaturallySpeaking Standard 8", http://www.nuance.com/naturallyspeaking/standard/features.asp.

(Continued)

*Primary Examiner* — Huyen X. Vo

(57) ABSTRACT

Intelligent speech recognition is used to provide users with the ability to utter more user friendly commands. Satisfaction is increased when a user can vocalize a subset of a formal command name and still have the intended command identified and processed. Moreover, greater accuracy in identifying a command application from a user's utterance can be achieved by ignoring command choices associated with unlikely user utterances. An intelligent speech recognition system can identify differing acceptable verbal command phrase forms, e.g., but not limited to, complete commands, command subsequences and command subsets, for different commands supported by the system. Subset blocking words are identified for assistance in reducing the ambiguity in matching user verbal command phrases with valid commands supported by the intelligent speech recognition system.

20 Claims, 19 Drawing Sheets

U.S. PATENT DOCUMENTS

| | | | |
|---|---|---|---|
| 7,120,582 B1 * | 10/2006 | Young et al. | 704/255 |
| 7,349,845 B2 * | 3/2008 | Coffman et al. | 704/257 |
| 7,437,297 B2 * | 10/2008 | Chaar et al. | 704/275 |
| 7,617,093 B2 * | 11/2009 | Ramsey | 704/251 |
| 7,676,358 B2 * | 3/2010 | Coden et al. | 704/4 |
| 2004/0080622 A1 | 4/2004 | Gombert | |
| 2005/0216271 A1 | 9/2005 | Konig | |

OTHER PUBLICATIONS

"IBM Achieves Major Breakthrough in Voice Recognition", http://wwwm-03.ibm.com/press/us/en/pressrelease/19150.wss.

Schmandt, et al., "Augmenting a Window System with Speech Input", Aug. 1990, http://www.media.mit.edu/speech/papers/1990/schmandt_IEEE90_augmenting.pdf.

* cited by examiner

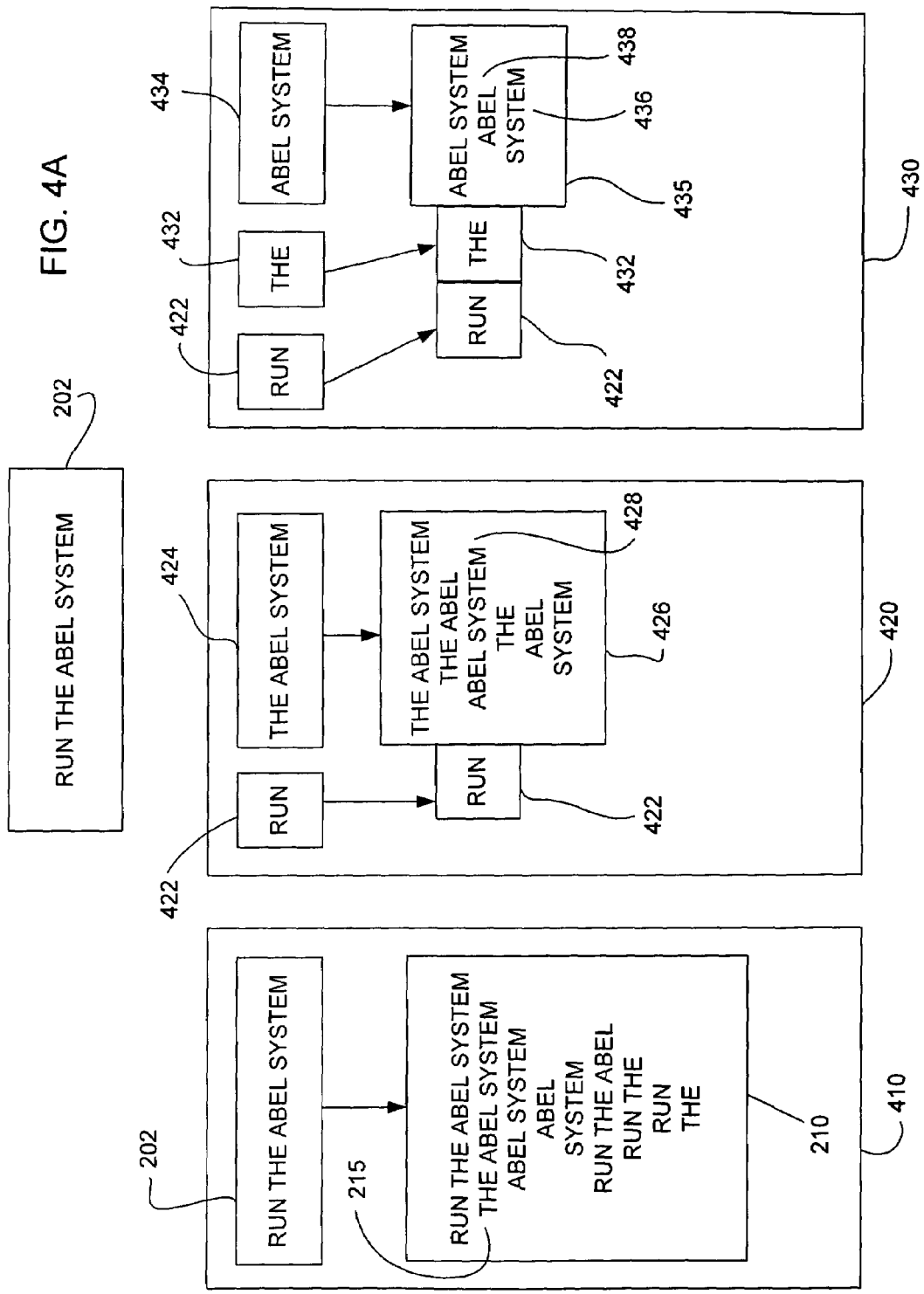

INTELLIGENT SPEECH RECOGNITION OF INCOMPLETE PHRASES

BACKGROUND

Using speech recognition applications users of computers and computer-based devices (e.g., BLACKBERRY® handheld devices, computer-based cell phones, etc.), collectively referred to herein as computing devices, can give a verbal command and expect the computing device to take a corresponding action in response. Verbal computing device commands in the English language currently generally take the form of a verb, i.e., action, followed by the entire name of an object. Exemplary verbal computing device commands include "Delete the word Fred," "Run Red Star Ball V1 5.2," and "Click Tools".

The number of verbal computing device commands for a system is generally the number of verbs, or actions, multiplied by the number of objects. Typical computing device systems that use speech recognition must support approximately fifty (50) verbs and generally five hundred (500) objects, which equates to thousands of valid verbal computing device commands.

The process of applying speech recognition for verbal commands by requiring the computing device user to utter a verb followed by the entire object name is workable. However, the experience can get frustrating because of long-winded verbal command requirements, i.e., the requirement that the verbal computing device commands include all the words of the entire command. Some if not many users would find a computing device more flexible and easy to use if, for example, their verbal command "Run Ball" was correctly responded to, rather than always having to utter "Run Red Star Ball V1 5.2" to get the same action.

User frustration can occur when the computing device fails to take action because a user neglects to vocalize the entire command. For example, a user's command "Run Red Star Ball V1" will fail to launch the appropriate application even though it is only missing the final "5.2" command designation. Other sources of frustration can arise from a user failing to vocalize one or more interim command words. For example, the verbal command "Run Star Ball V1 5.2" will not be processed because the user has neglected to include the interim word "Red" in the verbal command. Additionally, users can get frustrated when they are required to include the proper action, or verb, in their verbal command phrase, even when there is only one plausible action for the identified object at a particular time. For example, a user may find it frustrating, and cumbersome, when required to say "Run Red Start Ball V1 5.2" when attempting to launch the Red Star Ball V1 5.2 program, especially when the only plausible action for when the phrase "Red Star Ball" is vocalized is to initiate, or run, the Red Star Ball V1 5.2 program.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include technology that provides for reliable recognition and response to verbal command phrases that include less words then are in the intended application command.

In an embodiment intelligent speech recognition is used to identify a verbal command phrase that includes a consecutive subsequence of words of an application command although the consecutive subsequence of words is not the entire application command expression. In another embodiment intelligent speech recognition is used to identify a verbal command phrase that contains a subset of words, in order, of an application command even though the subset of words is not the entire application command expression and is also not a consecutive subsequence of the words of the entire application command.

In both of these embodiments the verbal command phrase is identified and provided, or otherwise made available, to the respective program application for processing.

In an aspect of an embodiment a definition of the acceptable phrases for an application command, i.e., a context free grammar, is created for use in identifying valid verbal command phrases. In general, a context free grammar is a definition of the acceptable verbal command phrases for a respective application command.

In another aspect of an embodiment an accumulation of subset blocking words is compiled and used in identifying invalid verbal command phrases. In an embodiment subset blocking words are words that in and of themselves generally fail to provide any meaningful identification of an application command or command phrase, and/or words that have been identified as capable of being easily mistaken for, or otherwise matched to, user mumbles. In an embodiment the accumulation of subset blocking words is accomplished taking into consideration, inter alia, a word's phonemic length, i.e., the number of sounds in the word, and the commonality, or frequency, of the word in the spoken language.

BRIEF DESCRIPTION OF THE DRAWINGS

These and other features will now be described with reference to the drawings of certain embodiments and examples which are intended to illustrate and not to limit the invention, and in which:

FIGS. 4A and 4B depict various scenarios of command and command phrase definitions in an intelligent speech recognition system.

DETAILED DESCRIPTION

In the following description, for purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention. Any and all titles used throughout are for ease of explanation only and are not for use in limiting the invention.

Figure 1:
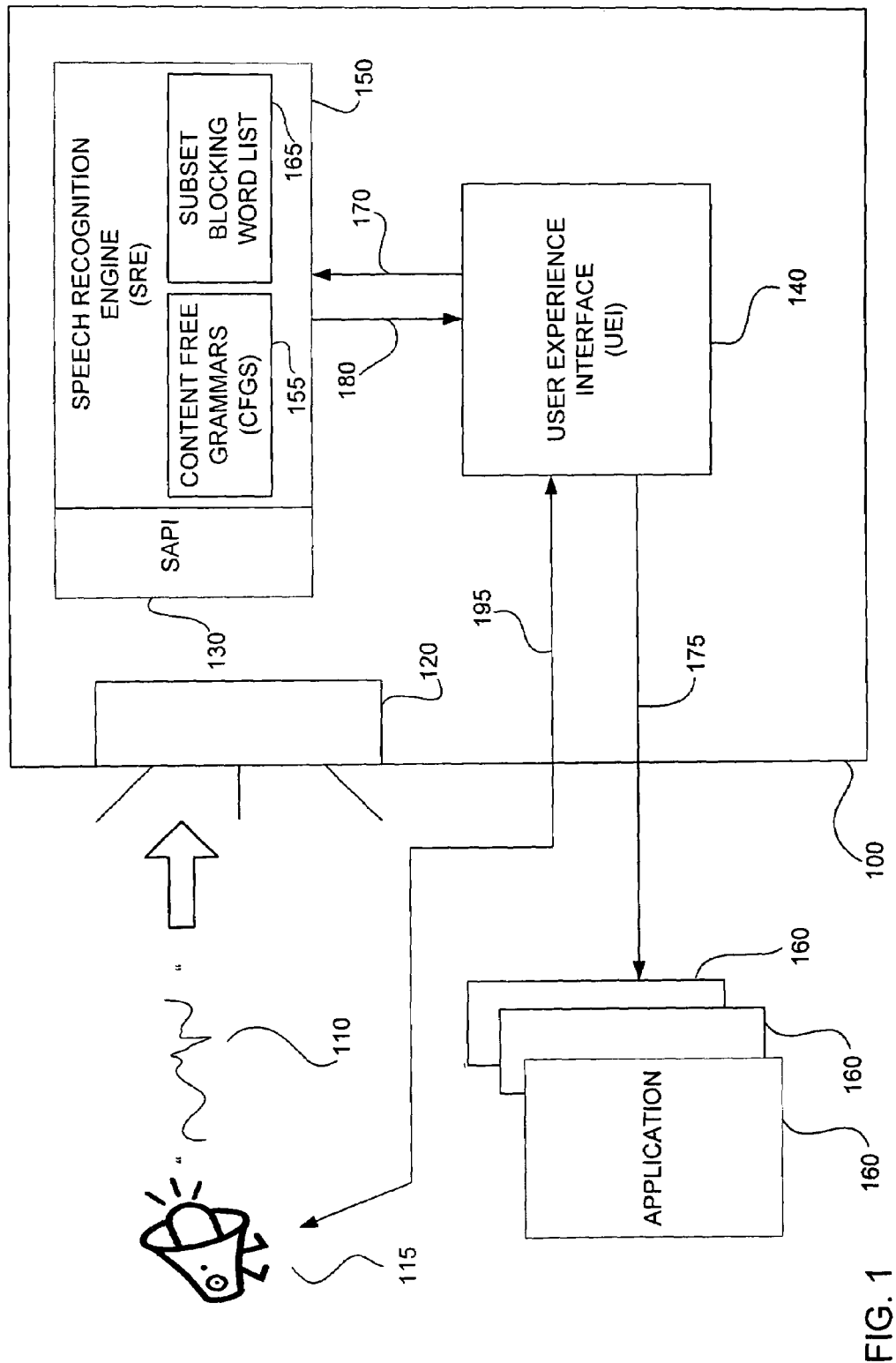
FIG. 1 is an embodiment intelligent speech recognition system for identifying verbal command phrases and matching them to application commands.

An embodiment computing device system supporting intelligent speech recognition of incomplete phrases 100, depicted in FIG. 1 and also referred to herein as an intelligent speech recognition system 100, is a flexible system for reliably sensing, and responding to, verbal phrases, or utterances. In an embodiment the intelligent speech recognition system 100 recognizes and responds to complete verbal commands as well as command subsequences and command subsets.

In an embodiment a command subsequence, or simply subsequence, contains less than all the words of the corresponding application command, or command phrase, but the subsequence has no interim missing command, or command phrase, words, as further explained below. As used herein, a command phrase is a partial command; i.e., a command phrase has some, but not all, of the words of the corresponding command. In an embodiment a command subset, or simply subset, contains less than all the words of the corresponding application command, or command phrase, and the subset can have one or more interim missing command, or command phrase, words, as further explained below.

Figure 2:
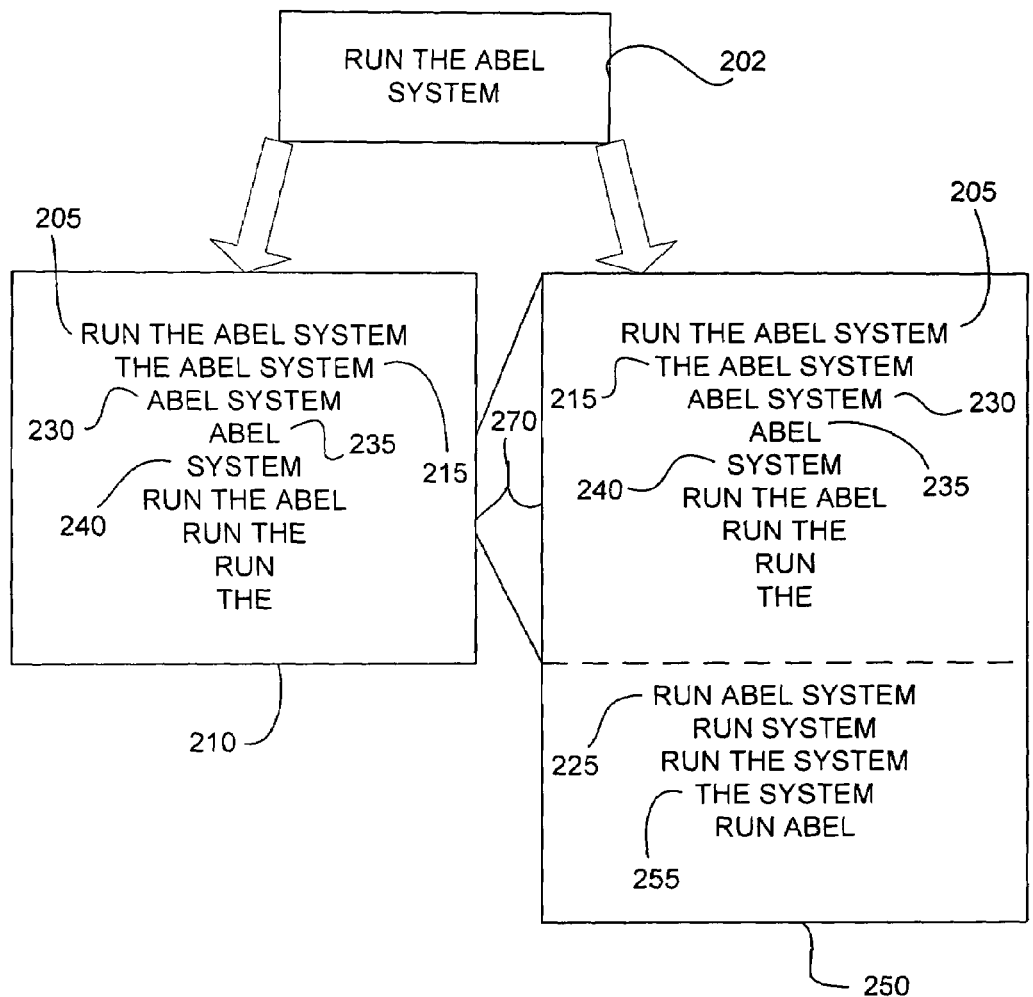
FIG. 2 depicts exemplary command subsequences and exemplary command subsets for a fictional application command.

As noted, in an embodiment a command subsequence contains less than all the words of the corresponding application command, or command phrase, but the subsequence has no interim missing command, or command phrase, words. Referring to FIG. 2, for example, assume a complete application command supported by a computing device is "Run The Abel System" 202, which activates, or causes to run, the program "The Abel System".

Exemplary list 210 identifies acceptable subsequences for the command "Run The Abel System" 202. The subsequences in list 210 contain one or more words of the application command "Run The Abel System" 202, in order, with no missing intervening, or interim, command words. For example, "The Abel System" 215 is a valid subsequence for the command "Run The Abel System" 202, even though it is missing the beginning word "Run". However, "Run The System" is not a valid subsequence as it is missing the interim word "Abel" required between "The" and "System".

In an embodiment subsequences can fail to have two or more words of the respective application command, or command phrase, as long as the subsequence words are in the order of the command, or command phrase, words and there are no missing interim command, or command phrase, words. Thus, "Abel System" 230 is a valid subsequence for the application command "Run The Abel System" 202, even though the subsequence 230 is missing the first two words, "Run" and "The," of the complete command 202.

In an embodiment the complete application command expression is a valid subsequence for the application command. In this embodiment "Run The Abel System" 205 is a subsequence of the command "Run The Abel System" 202.

In an embodiment one word subsequences are valid; e.g., "Abel" 235 and "System" 240 are both valid subsequences for the application command "Run The Abel System" 202.

As noted, in an embodiment a command subset, or simply subset, contains less than all the words of the corresponding application command, or command phrase, and the subset can have one or more interim missing command, or command phrase, words. In this embodiment, however, the words in the subset must be in the same order as the words in the corresponding application command, or command phase.

For example, again assume "Run The Abel System" 202 of FIG. 2 is an application command supported by a computing device which activates, or causes to run, the program "The Abel System". Exemplary list 250 identifies acceptable subsets for the command "Run The Abel System" 202. The subsets identified in list 250 contain one or more words, in correct order, of the command "Run The Abel System" 202 although they may have missing interim command words. For example, "Run Abel System" 225 is a valid subset for the command "Run The Abel System" 202 even though it is missing the interim command word "The" between "Run" and "Abel". As another example, "The System" 255 is also a valid subset for the command "Run The Abel System" 202 even though it is missing the beginning command word "Run" and the interim command word "Abel".

In an embodiment all valid command subsequences are also valid command subsets. In this embodiment the subsequences 230 identified in list 210 are also subsets of the command "Run The Abel System" 202.

In an embodiment the complete application command expression is a valid command subset. In this embodiment "Run The Abel System" 205 is a subset of the command "Run The Abel System" 202.

In an embodiment one word subsets are valid; e.g., "Abel" 235 and "System" 240 are both valid subsets for the application command "Run The Abel System" 202.

In an embodiment, while both subsequences and subsets may have less than all the words in the corresponding application command or command phrase the subsequence and subset words must be in the same order as they are in the application command or command phrase. Thus, for example, "Run The System Abel" is neither a valid subsequence nor subset for the command "Run The Abel System" 202 as its word order is incorrect; i.e., in this example "System" cannot come before "Abel" in a subsequence or subset for the command "Run The Abel System" 202.

Referring back to FIG. 1, as noted, in an embodiment the intelligent speech recognition system 100 recognizes and responds to complete verbal commands, verbal command subsequences and verbal command subsets. In alternative embodiments the intelligent speech recognition system 100 can recognize and respond to any combination of complete verbal commands, verbal command subsequences and verbal command subsets; e.g., just complete verbal commands and verbal command subsequences.

In an embodiment a User Experience Interface (UEI) 140 gathers, or otherwise retrieves, 175 commands and/or command phrases to be speech enabled, i.e., that will be processed upon a user vocalization of the command or command phrase, and/or subsequences and/or subsets of the command or command phrase, from an application 160 supported by the intelligent speech recognition system 100. An embodiment intelligent speech recognition system 100 supports one or more applications 160.

In an embodiment the UEI 140 extracts, or otherwise collects, the application commands and/or command phrases to be supported by the intelligent speech recognition system 100 from various command identity locations. Exemplary command identity locations include files on disk, screen controls, e.g., computing device menus, buttons, etc., text fields and application databases. In an embodiment neither the applications 160 nor the command identity locations have any knowledge that the UEI 140 is using them to support verbal command processing. Thus, in an embodiment the applications 160 are passive with respect to speech recognition; i.e., they are unaware that one or more of their user commands may be processed upon an acceptable user verbalization for the command.

In another embodiment the UEI 140 can also, or alternatively, define one or more commands and/or command phrases to be speech enabled, i.e., that will be processed upon a user vocalization of the command or command phrase, and/or subsequences and/or subsets of the command or command phrase. In an aspect of this alternative embodiment the intelligent speech recognition system 100 does not support any applications 160 if all commands and command phrases that are speech enabled are internal to the intelligent speech recognition system 100. For purposes of this patent, commands and command phrases internal to the intelligent speech recognition system 100 are also referred to herein as application commands.

In an alternative embodiment one or more applications 160 are aware of being speech enabled via the intelligent speech recognition system 100 and can be active in one or more respects with regard to speech recognition and verbal command processing.

In an embodiment the UEI 140 determines what verbal command phrases, also referred to herein as utterances, i.e., the complete command or something less than the complete command, e.g., subsequences or subsets, are acceptable for an application command or command phrase. The UEI 140 generates one or more Context Free Grammars (CFGs) 155 for the various application commands and/or command phrases supported by the intelligent speech recognition system 100. In an embodiment the CFGs 155 define, or otherwise imply, the acceptable utterances for the application commands and/or command phrases supported by the intelligent speech recognition system 100. The UEI 140 provides 170 the CFGs 155 to the Speech Recognition Engine (SRE) 150 of the intelligent speech recognition system 100 for use in processing verbal command phrases, or utterances, as further explained below.

In an embodiment a computing device user 115 utters a verbal command phrase 110, or utterance, via an audio device 120, e.g., a microphone, to the intelligent speech recognition system 100. The utterance 110 is forwarded to a Speech Application Program Interface (SAPI) 130 associated with the SRE 150.

In an embodiment pre-recorded speech, e.g., speech recorded via a dictaphone or other recording device onto any well-known recording media, that contains one or more utterances 110 for an application command supported by the intelligent speech recognition system 100 can be introduced into the system 100 via the recording media, e.g., a CD, a diskette, a computer tape, etc. The utterance(s) 110 in the pre-recorded speech are forwarded to the SAPI 130 associated with the SRE 150.

In an embodiment the SAPI 130 is an extension that, inter alia, gives a computing device the ability to recognize human speech as input and create human-like audio output from printed text. In an embodiment the SAPI 130 provides, or otherwise makes available, the user utterances 110 to the SRE 150.

In an embodiment the SRE 150 functions to identify a user's utterance 110 and match, or otherwise associate, it with the intended application command. Thus, in an embodiment the SRE 150 attempts to produce a recognition for a user's utterance 110 based on the actual utterance 110 and the CFGs 155. In an embodiment a recognition is an identification of the utterance 110, i.e., a determination by the SRE 150 of what a user 115 actually said.

In an embodiment, upon generating a recognition for a user's utterance 110 the SRE 150 provides 180 the recognition and the application command associated with the recognition to the UEI 140 for further processing. In an embodiment the SRE 150 also provides the UEI 140 with an indication of how reliable the SRE 150 determines the recognition to be, i.e., an indication of how likely, or correct, the SRE 150 believes the recognition is, also referred to herein as recognition score. In alternative embodiments the SRE 150 may provide 180 less, more and/or different information to the UEI 140 for a user's utterance 110.

In an embodiment the SRE 150 may or may not succeed in producing a recognition for a user utterance 110, and if produced, the recognition may or may not be correct.

In an embodiment, if the SRE 150 fails to produce a recognition for a user's utterance 110 the SRE 150 will notify 180, or otherwise indicate to, the UEI 140 that no application command could be identified for the current utterance 110.

In an embodiment, if the UEI 140 receives a recognition and associated application command from the SRE 150, the UEI 140 will then request 170 the SRE 150 make x more attempts at producing recognitions based on the current user utterance 110 and the CFGs 155. In an embodiment x can be a number between five (5) and two hundred (200). In an alternative embodiment x can be a number between zero (0), i.e., no more recognitions requested, and one thousand and twenty four (1024). In yet alternative embodiments x can be other values.

In an embodiment the UEI 140 can receive 180 more than one identified application command for a recognition for an utterance 110. For example, assume a verbal command phrase "Play Hits" refers to two different fictional application commands for playing media: "Play Simply Blue Hits" and "Play Hits". Assuming the SRE 150 generates the recognition "Play Hits" for the a user's utterance "Play Hits," then in this embodiment the SRE 150 can match the recognition to the command "Play Hits" and also to the command "Play Simply Blue Hits". Thus, in this example the UEI 140 will receive 180 from the SRE 150 the recognition "Play Hits" identified with both the command "Play Hits" and the command "Play Simply Blue Hits".

In an embodiment the UEI 140 can also receive 180 more than one recognition and application command identified therewith for a user's utterance 110. For example, assume one or more CFGs 155 define the application commands "Play Red Zone" and "Play Lead Cone". Also assume a user 115 utters the verbal command phrase "Red Zone". In this example the SRE 150 generates a first recognition "Red Zone" and identifies it with the application command "Play Red Zone". The SRE 150 also generates a second recognition "Lead Cone" and identifies it with the application command "Play Lead Cone". In this embodiment and example the UEI 140 will receive 180 from the SRE 150 the recognition "Red Zone" identified with the application command "Play Red Zone" and the recognition "Lead Cone" identified with the application command "Play Lead Cone".

In an embodiment the UEI 140 determines the application command to be processed from the one or more application commands identified by the SRE 150 for an utterance 110, as further explained below, and passes, or otherwise provides, 175 the application command to the appropriate application 160 for processing. In an embodiment, if the application command is internal to the intelligent speech recognition system 100, then the UEI 140 processes the application command, or, alternatively, provides the application command to another component of the intelligent speech recognition system 100 for processing.

In an aspect of an embodiment where an utterance 110 is pre-recorded speech and the SRE 150 fails to generate a recognition for the utterance 110, the UEI 140 indicates the failure to process in an error log. In another aspect of an embodiment where an utterance 110 is pre-recorded speech and no recognition is generated for it, no error is indicated but no command is processed in response to the utterance 110.

In an embodiment the SRE 150 generates one or more CFGs 155 for application commands identified by the UEI 140 for one or more applications 160 and/or that are internal to the intelligent speech recognition system 100. As previously noted, the CFGs 155 define, or otherwise imply, the acceptable utterances for the application commands and command phrases supported by the intelligent speech recognition system 100.

Figure 3:
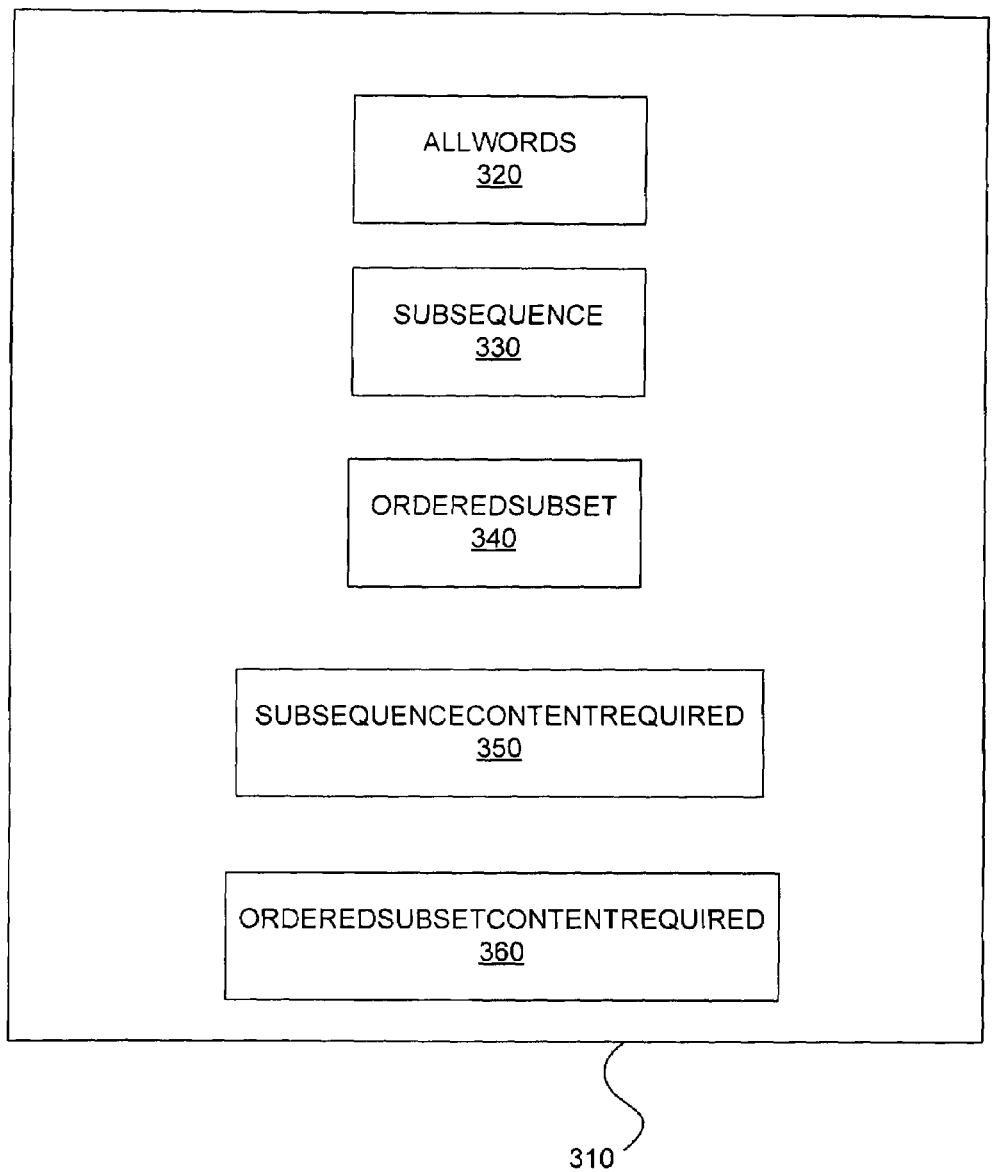
FIG. 3 depicts embodiment context free grammar options for identifying acceptable verbal command phrase forms for application commands and/or command phrases.

Referring to FIG. 3, in an embodiment the UEI 140 specifies a CFG 155 to the SRE 150 through one or more calls to one or more APIs. In an embodiment the UEI 140 uses an AddWordTransition API and an AddTextSubset API to specify a CFG 155 to the SRE 150.

In an embodiment the UEI 140 can use one of five options 310 to assist in defining acceptable utterances for an application command or command phrase.

An embodiment first option, Allwords 320, used with an application command or command phrase requires a computing device user 115 to vocalize the entire command or command phrase, in proper order, for the user's utterance 110 to be valid. For example, using the Allwords option 320 for the exemplary command "Run The Abel System" 202 requires that a computing device user 115 vocalize the complete command "Run The Abel System" 202 for this command to be launched, or otherwise executed.

With the Allwords option 320, the utterance "Run Abel System" for the command "Run The Abel System" 202 is invalid as it is incomplete, i.e., the word "The" is missing from the utterance 110. With the Allwords option 320, the utterance "Run The System Abel" for the command "Run The Abel System" 202 is also invalid as, though it contains all the command words, they are in an incorrect order, i.e., "System" is erroneously vocalized before "Abel".

An embodiment second option for defining acceptable utterances 110 for an application command or command phrase, Subsequence 330, allows a computing device user 115 to vocalize a command subsequence, i.e., less than the complete command or command phrase, but the words of the user's utterance 110 must contain consecutive command words, in order, with no missing interim words. For example, using the Subsequence option 330 for the command "Run The Abel System" 202 will result in a CFG 155 that defines, or otherwise implies, the subsequences identified in list 210 of FIG. 2. Thus, with the Subsequence option 330 the utterance "The Abel System" 215 for the command "Run The Abel System" 202 is valid as it is a proper command subsequence.

An embodiment third option, OrderedSubset 340, allows a computing device user 115 to vocalize a command subset, i.e., less than the complete command or command phrase, and although the words of a user's utterance 110 must be in the same order as they are in the command or command phrase, a command subset can have missing interim command words. For example, using the OrderedSubset option 340 for the command "Run The Abel System" 202 will result in a CFG 155 that defines, or otherwise implies, the subsets identified in list 250 of FIG. 2. Thus, with the OrderedSubset option 340, the utterance "Run Abel System" 225 for the command "Run The Abel System" 202 is valid as it is a proper command subset.

An embodiment fourth option for defining acceptable utterances 110 for an application command or command phrase, SubsequenceContentRequired 350, allows a computing device user 115 to vocalize a command subsequence but the subsequence cannot contain all subset blocking words, except under certain circumstances as further explained below. With the SubsequenceContentRequired option 350, user utterances 110 that contain only subset blocking words are generally invalid and will not be acted upon.

In an embodiment subset blocking words are content-free, or non-content words, i.e., words that in and of themselves do not provide meaningful insight into the subject matter of a user utterance 110, and/or words that have been identified as capable of being easily mistaken for, or otherwise matched to, user utterance mumbles, as further discussed below. In an embodiment subset blocking words can be words and/or word phrases that identify punctuation marks, e.g., "colon" for :, and words and/or word phrases that identify symbols, e.g., "dollar sign" for $. In an embodiment content words are, conversely, words that are not identified as subset blocking words, i.e., non subset blocking words.

As an example of the effects of the SubsequenceContentRequired option 350 on a command or command phrase, assume this option 350 is used for the command "Run The Abel System" 202. Further assume that the word "the" is identified as a subset blocking word. In this example a computing device user's utterance "The" for the command "Run The Able System" 202 is invalid and will not be acted upon as it contains only a subset blocking word, "the," of the application command 202.

An embodiment fifth option for defining acceptable user utterances 110 for an application command or command phrase, OrderedSubsetContentRequired 360, allows a computing device user 115 to verbalize a command subset, but the subset cannot contain all subset blocking words, except under certain circumstances as further explained below. With the OrderedSubsetContentRequired option 360, user utterances 110 that contain only subset blocking words are generally invalid and will not be acted upon.

For example, assume the OrderedSubsetContentRequired option 360 is used for the command "Run The Abel System" 202. Further assume that the word "the" is identified as a subset blocking word. As in the prior example with regard to the SubsequenceContentRequired option 350, in this example with the OrderedSubsetContentRequired option 360 a computing device user's verbal command phrase "The" for the command "Run The Abel System" 202 is invalid and will not be acted upon it contains only a subset blocking word, "the," of the application command 202.

In an embodiment the SRE 150 can treat punctuation identified in a CFG 155 for an application command or command phrase as optional regardless of the option, Allwords 320, Subsequence 330, OrderedSubset 340, SubsequenceContentRequired 350 or OrderedSubsetContentRequired 360, used for generating the respective CFG 155 for the application command or command phrase and regardless of whether or not the punctuation is defined, or otherwise identified as, a subset blocking word.

For example, assume "Riley Operations: Speech Recognition" is a valid application command supported by an intelligent speech recognition system 100, and it is defined by a CFG 155 with the Allwords option 320. In this embodiment and example, the SRE 150 can treat the punctuation in the command, i.e., "colon," as optional. Thus a user utterance "Riley Operations Speech Recognition," which fails to include an enunciation of the punctuation "colon," is as valid as the user utterance "Riley Operations Colon Speech Recognition," which does include the punctuation.

As previously noted, in an embodiment there can be circumstances where user utterances 110 consisting entirely of one or more subset blocking words are valid even when the SubsequenceContentRequired option 350 and the OrderedSubsetContentRequired option 360 are used for the respective application command or command phrase. One such circumstance is when an application command consists entirely of subset blocking words.

For example, assume that letters and punctuation are identified as subset blocking words in an intelligent speech recognition system 100, and that the system 100 support an application command choice "A:". In this example the application command choice contains only subset blocking words, i.e., the letter "A" and the punctuation "colon".

In this example, under the general rule, if the SubsequenceContentRequired option 350 or the OrderedSubsetContentRequired option 360, which each generally require a user utterance 110 with at least one non subset blocking word, is used with the verbal command choice "A:", a user's vocalization of this command choice will never be determined valid and identified with the proper application command choice.

Thus, in an embodiment, if the UEI 140 uses the SubsequenceContentRequired option 350 for an application command consisting entirely of subset blocking word(s), the respective CFG 155 for the application command will be generated as if the Subsequence option 330 was used. Additionally, in this embodiment, if the UEI 140 uses the OrderedSubsetContentRequired option 360 for an application command consisting entirely of subset blocking word(s), the respective CFG 155 for the application command will be generated as if the OrderedSubset option 340 was used. In this embodiment, and referring to the example of the application command choice "A:", the utterances "A colon," "A" and "colon" are all valid for either the SubsequenceContentRequired option 350 or the OrderedSubsetContentRequired option 360.

As another example in this embodiment, assume "off" is identified as a subset blocking word and the intelligent speech recognition system 100 supports an application command "Off". This application command consists of one subset blocking word. In this example, under the general rule, if the SubsequenceContentRequired option 350 or the OrderedSubsetContentRequired option 360 is used with the application command "Off," a user's vocalization of this command will never be determined valid.

Thus, in an embodiment, if the UEI 140 uses the SubsequenceContentRequired option 350 for an application command consisting entirely of one subset blocking word, the respective CFG 155 for the application command will define the one subset blocking word as a valid user utterance. Additionally, in this embodiment, if the UEI 140 uses the OrderedSubsetContentRequired option 360 for an application command consisting entirely of one subset blocking word, the respective CFG 155 for the application command will define the one subset blocking word as a valid user utterance.

In an embodiment another circumstance where user utterances 110 consisting entirely of one or more subset blocking words are valid even when the SubsequenceContentRequired option 350 and the OrderedSubsetContentRequired option 360 are used for the respective application command or command phrase is when the application command or command phrase begins with a subset blocking word followed by a delimiter. In an embodiment a delimiter is punctuation that separates two words or phrases. For example, in an application command "Off: Turn Speech Recognition Off," the colon (:) is a delimiter separating the phrases "Off" and "Turn Speech Recognition Off".

In the exemplary application command "Off: Turn Speech Recognition Off," if the word "off" is a subset blocking word, and if the SubsequenceContentRequired option 350 or the OrderedSubsetContentRequired option 360 is used with this application command, a user utterance "Off" would be invalid. In this example the phrase "Turn Speech Recognition Off" is an explanation for the command "Off". Thus, in an embodiment disallowing a user utterance of "Off" is not desirable as it is meaningful for the complete command "Off: Turn Speech Recognition Off".

Therefore, in an embodiment, if the UEI 140 uses the SubsequenceContentRequired option 350 for an application command or command phrase that begins with a subset blocking word followed by a delimiter, the respective CFG 155 for the application command or command phrase will define, or otherwise identify, the first application command or command phrase, subset blocking, word as a valid subsequence. In this embodiment, if the UEI 140 uses the OrderedSubsetContentRequired option 360 for an application command or command phrase that begins with a subset blocking word followed by a delimiter, the respective CFG 155 for the application command or command phrase will define, or otherwise identify, the first application command or command phrase, subset blocking, word as a valid subset. In this embodiment, and referring to the example of the application command "Off: Turn Speech Recognition Off," a user utterance "Off" is valid for either the SubsequenceContentRequired option 350 or the OrderedSubsetContentRequired option 360.

In an embodiment the UEI 140 can include more than one application command or command phrase in the one or more calls to the one or more APIs for specifying one or more CFGs 155 to the SRE 150 if each of the included application commands or command phrases are assigned the same option, i.e., the Allwords option 320, the Subsequence option 330, the OrderedSubset option 340, the SubsequenceContentRequired option 350 or the OrderedSubsetContentRequired option 360. For example, the UEI 140 can include the exemplary command "Run The Abel System" 202 and the exemplary command "Run Abel Demo System" using the Subsequence option 330 in the same call(s) made to the API(s) for specifying a CFG 155, or CFGs 155, to the SRE 150 for each of these commands.

In an embodiment one CFG 155 defines, or otherwise implies, the acceptable utterances for related application commands and/or command phrases with the same option, i.e., 320, 330, 340, 350 or 360. For example, in this embodiment one CFG 155 can define the acceptable utterances for all commands and/or command phrases associated with one application screen, or window or user interface, e.g., one Microsoft Word® application screen, that have the same option, i.e., 320, 330, 340, 350 or 360. In an alternative embodiment one CFG 155 defines, or otherwise implies, the acceptable utterances for all application commands and/or command phrases with the same option, i.e., 320, 330, 340, 350 or 360, for one application 160. Other alternative embodiments employ other application command and/or command phrase groupings with respect to CFGs 155. As an example, in one such alternative embodiment, one CFG 155 defines, or otherwise implies, one application command, or command phrase, of one application 160.

As noted a CFG 155 can define, or otherwise imply, the acceptable utterances for one or more application commands and/or one or more command phrases. In an embodiment the UEI 140 can define various portions of an application command, i.e., command phrases, and use different options, i.e., 320, 330, 340, 350 and 360, for each of the command phrases when specifying a CFG 155 to the SRE 150 for the respective application command.

For example, referring to FIG. 4A, an exemplary application command is "Run The Abel System" 202. In a first scenario 410, a CFG 155 is specified to the SRE 150 for this application command 202 with the Subsequence option 330. Thus, the CFG 155 for this first scenario 410 defines, or otherwise implies, the subsequences identified in list 210 as valid user utterances 110 for the application command "Run The Abel System" 202.

In this example, a second scenario 420 has the UEI 140 defining two command phrases for the application command "Run The Abel System" 202: the command phrase "Run" 422 and the command phrase "The Abel System" 424. In this second scenario 420, a CFG 155 is specified to the SRE 150 for the command phrase "Run" 422 with the Allwords option 320 and for the command phrase "The Abel System" 424 with the Subsequence option 330. In this scenario 420 an utterance 110 must contain the first command phrase "Run" 422 and a valid subsequence, identified in list 426, for the second command phrase "The Abel System" 424.

As can be seen, in the first scenario 410 the subsequence "The Abel System" 215 is a valid user utterance 110 for the application command "Run The Abel System" 202, and if properly recognized, the application command "Run The Abel System" 202 will be processed. In the second scenario 420, however, "The Abel System" is an invalid user utterance 110, even though it is a valid subsequence for the command phrase "The Abel System" 424, as the CFG 155 in the second scenario 420 requires a user to first say "Run" 422 and then a valid subsequence for the command phrase "The Abel System" 424 to invoke the "Run The Abel System" 202 command verbally.

As another example of how defining command phrases with a CFG(s) 155 can result in different valid user utterances 110 than defining the respective command, in the second scenario 420 a user utterance "Run Abel System" is valid as the user has said "Run" 422, and a valid subsequence "Abel System" 428 for the command phrase "The Abel System" 424. However, in the first scenario 410 "Run Abel System" is an invalid utterance 110 as it is not a subsequence of the command "Run The Abel System" 202 in that it is missing the interim word "The" between "Run" and "Abel".

In an embodiment rules are used to imply the acceptable verbal utterances 110 for the command phrases of an application command, e.g., for the command phrase "Run" 422 and the command phrase "The Abel System" 424 of the application command "Run The Abel System" 202, and these rules are associated with a rule identifying the application command. In other embodiments other associations can be used to imply the acceptable verbal utterances 110 for command phrases of an application command and associate the command phrases with the application command.

In the example of FIG. 4A a third scenario 430 has the UEI 140 defining three command phrases for the application command "Run The Abel System" 202: the command phrase "Run" 422, the command phrase "The" 432 and the command phrase "Abel System" 434. In this third scenario 430 a CFG 155 is specified to the SRE 150 for the command phrase "Run" 422 with the Allwords option 320, for the command phrase "The" 432 with the Allwords option 320, and for the command phrase "Abel System" 434 with the Subsequence option 330. In the scenario 430 an utterance 110 must contain the first command phrase "Run" 422, the second command phrase "The" 432 and a valid subsequence, identified in list 435, for the third command phrase "Abel System" 434.

In the third scenario 430 "Run The System" is a valid user utterance 110 for the command "Run The Abel System" 202 as the utterance 110 contains the required word "Run" 422, the required word "The" 432 and a valid subsequence, e.g., "System" 436, for the command phrase "Abel System" 434. Yet "Run The System" is an invalid user utterance 110 for either the first scenario 410 or the second scenario 420. In the first scenario 410 "Run The System" is an invalid subsequence for the command "Run The Abel System" 202 as it is missing the interim word "Abel" required between "Run" and "The". In the second scenario 420, while the utterance "Run The System" contains the required word "Run" 422, it fails to have a valid subsequence for "The Abel System" 424 in that the word "Abel" is missing between the words "The" and "System".

In an embodiment, when an application command is defined by two or more command phrases valid user utterances 110 must be in the correct command word order. Thus, with reference to scenario 430 of FIG. 4A, in this embodiment, "The Run Abel" is an invalid utterance 110 even though it contains the required word "Run" 422, the required word "The" 432, and a valid subsequence, e.g., "Abel" 438, for the command phrase "Abel System" 434, as the uttered words "Run" and "The" are in incorrect application command order. In the application command "Run The Abel System" 202 associated with the CFG 155 defining the command phrases in scenario 430 "Run" precedes "The".

Figure 4B:
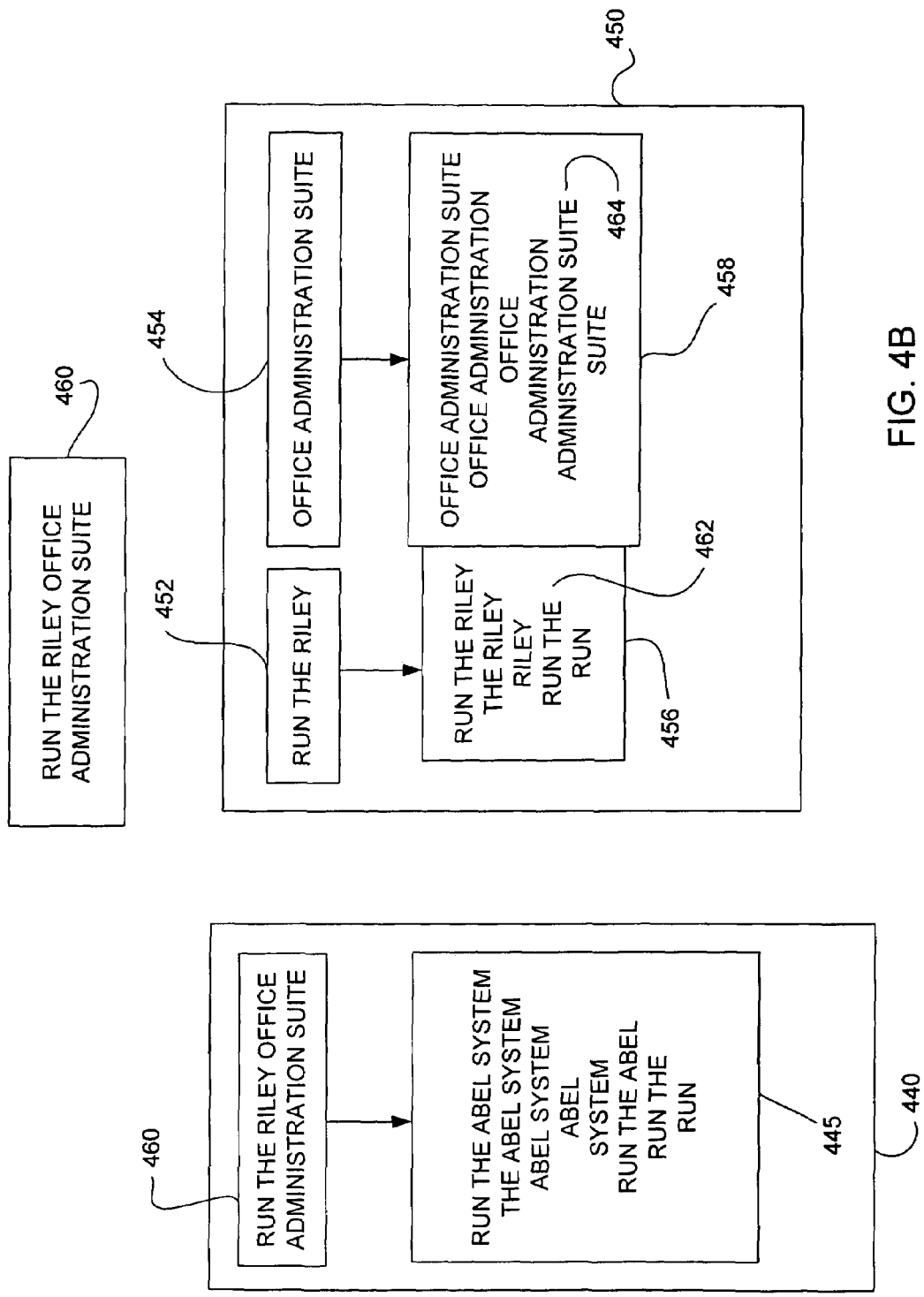

As yet another example of how defining command phrases with a CFG(s) 155 can result in different valid user utterances 110 than defining the respective command, and referring to FIG. 4B, a second exemplary application command is "Run The Riley Office Administration Suite" 460. In this example assume "the" is designated as a subset blocking word. In a first scenario 440 a CFG 155 is specified to the SRE 150 for the application command 460 with the SubsequenceContentRequired option 350. Thus, the CFG 155 for this first scenario 440 defines, or otherwise implies, the subsequences identified in list 445 as valid user utterances 110 for the application command "Run The Riley Office Administration Suite" 460. In this example, because the SubsequenceContentRequired option 350 was used, "The" is an invalid subsequence as it consists entirely of a subset blocking word.

In the example of FIG. 4B a second scenario 450 has the UEI 140 defining two command phrases for the application command "Run The Riley Office Administration Suite" 460: the command phrase "Run The Riley" 452 and the command phrase "Office Administration Suite" 454. In this second scenario 450 a CFG 155 is specified to the SRE 150 for the command phrase "Run The Riley" 452 with the SubsequenceContentRequired option 350 and for the command phrase "Office Administration Suite" 454 also with the SubsequenceContentRequired option 350. In the scenario 450 a user utterance 110 must contain a valid subsequence for the command phrase "Run The Riley" 452, as identified in list 456, and a valid subsequence for the command phrase "Office Administration Suite" 454, as identified in list 458. In this example, because the SubsequenceContentRequired option 350 was used with the command phrase "Run The Riley" 452, "The" is an invalid subsequence for this command phrase 452 as it consists entirely of a subset blocking word.

In the second scenario 450 of FIG. 4B, a user utterance "Run The Administration Suite" is valid as it contains a valid subsequence, i.e., "Run The" 462 for the first command phrase "Run The Riley" 452 and a valid subsequence, i.e., "Administration Suite" 464 for the second command phrase "Office Administration Suite" 454. However, in the first scenario 440 of this example, "Run The Administration Suite" is an invalid user utterance 110 as it is not a valid subsequence for the application command "Run The Riley Office Administration Suite" 460 in that it is missing the interim words "Riley" and "Office" required between "The" and "Administration".

FIGS. 4A and 4B are only examples of the many command phrase definitions for any particular application command and the various options and option combinations that can be used for command phrases and their respective application command.

Increased system, and user, flexibility is derived from the ability to define commands and command phrases with the various options supported by an embodiment intelligent speech recognition system 100, e.g., Subsequence 330, OrderedSubset 340, etc. For example, a user 115 now has generally many more acceptable verbal utterances 110 for any particular application command.

In addition, greater accuracy in identifying a command application from a user's utterance 110 can be achieved by defining application commands and/or command phrases with appropriate options, e.g., Subsequence 330, OrderedSubset 340, etc., and identifying and using subset blocking words that result in the intelligent speech recognition system 110 ignoring command choices associated with unlikely user utterances 110.

For example, assume an intelligent speech recognition system 100 supports the exemplary application commands "Run The Works" and "Run Knee System". Also assume that "Run The Works" is defined by two command phrases, "Run" with the Allwords option 320, and "The Works" with the OrderedSubsetContentRequired option 360. And assume that the "Run Knee System" application command is defined by two command phrases, "Run" with the Allwords option 320, and "Knee System" with the OrderedSubsetContentRequired option 360. Further assume that "the" is identified as a subset blocking word.

In this example, acceptable verbal utterances 110 for the "Run The Works" command application are "Run The Works" and "Run Works". "Run The" is an invalid verbal utterance 110 for "Run The Works" as though it contains the first command phrase "Run," "The" is a subset blocking word and thus is an invalid subset for the command phrase "The Works". As "Run The" is a generally meaningless utterance in and of itself, it is unlikely that many, if any, users 115 would utter this phrase to verbally activate a command, and therefore, in this example, the intelligent speech recognition system 100 is simply invalidating a generally unused and meaningless phrase.

In the example, acceptable verbal utterances 110 for the "Run Knee System" application command are "Run Knee System," "Run Knee" and "Run System".

Assume a user 115 says "Run Knee". The SRE 150 can generate a recognition of "Run Knee" for this utterance 110 and associate it with the application command "Run Knee System". The SRE 150 may also generate a recognition of "Run The" for the user utterance "Run Knee". In this case, "Run The" is an invalid utterance 110 for either the "Run The Works" application command or the "Run Knee System" command, and will therefore be ignored, or otherwise tagged as an invalid recognition.

Thus, in this example, an ignored, or invalid, recognition, e.g., "Run The," will not result in an application command that a user 115 did not intend, e.g., "Run The System," being identified for potential processing. In this case, by not allowing meaningless phrases to be acceptable user utterances 110 the intelligent speech recognition system 100 has increased its accuracy in identifying an application command for a user utterance 110.

Referring again to FIG. 1, in an embodiment the SRE 150 generates a subset blocking word list 165 that is an identification of the subset blocking words for the intelligent speech recognition system 100.

In an embodiment the SRE 150 uses the subset blocking word list 165 in conjunction with the CFGs 155 to identify invalid, i.e., unacceptable, user utterances 110.

In an embodiment the subset blocking word list 165 is a list of subset blocking words. In an alternative embodiment the subset blocking word list 165 is a hash table of subset blocking words. In yet other alternative embodiments the subset blocking word list 165 is represented in other formats and/or structures, such as, but not limited to, one or more definitions that identify, or otherwise imply, the subset blocking words for the intelligent speech recognition system 100.

Figure 5A:
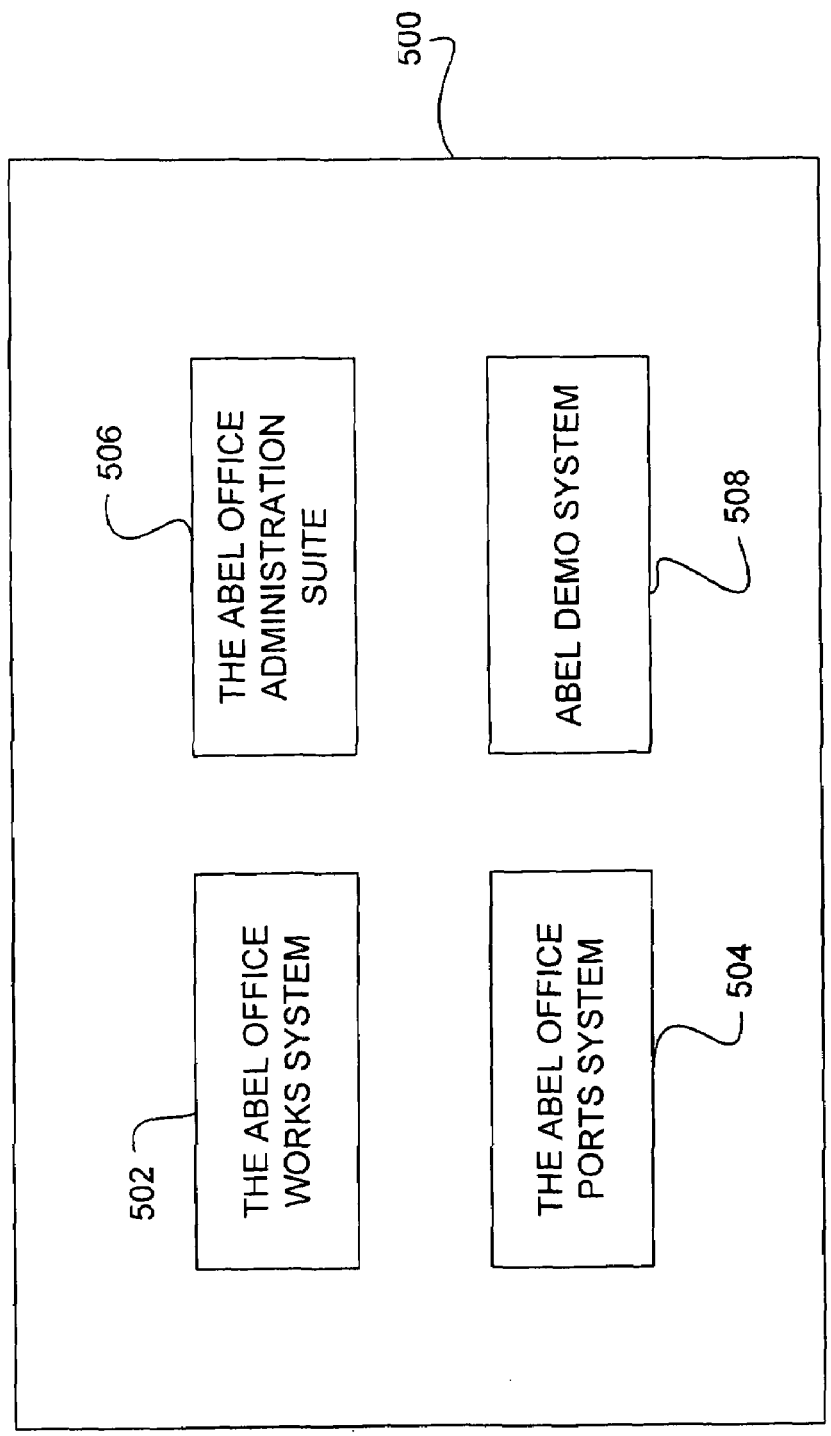
FIG. 5A depicts an exemplary application screen, or user interface, identifying four fictional user commands.
Figure 5B:
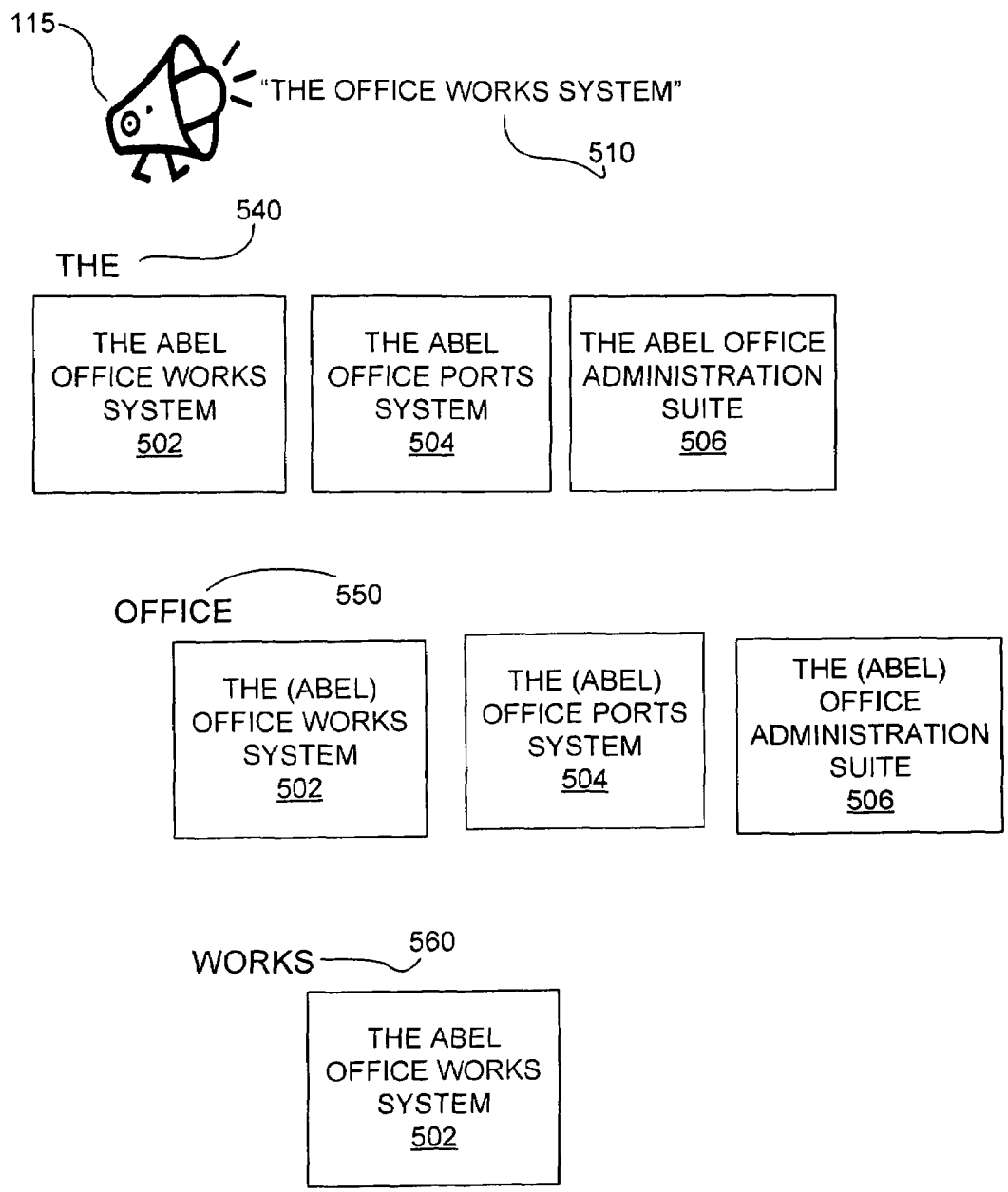
FIG. 5B is an exemplary processing flow for the identification of a valid user utterance, i.e., verbal command phrase.

FIG. 5B shows an exemplary logic flow that an embodiment intelligent speech recognition system 100 follows in identifying an application command to process from a user's valid utterance 510.

Referring to FIG. 5A, an application screen 500 supports four (4) Run commands that can each be activated by a user utterance 110. Each of the buttons 502, 504, 506 and 508 of application screen 500 identifies a program that a user 115 can initiate, i.e., cause to run. Assume for purposes of this example that the UEI 140 specifies a CFG 155 to the SRE 150 for each of commands "Run The Abel Office Works System," "Run The Abel Office Ports System," "Run The Abel Office Administration Suite" and "Run Abel Demo System" identified by their respective application screen buttons 502, 504, 506 and 508 with the OrderedSubset option 340. In this case, the intelligent speech recognition system 100 will identify valid command subsets for the commands supported by application screen 500.

Referring to FIG. 5B, assume a computing device user 115 utters the verbal command "The Office Works System" 510 in response to application screen 500 of FIG. 5A. In this example "The Office Works System" 510 is a valid verbal subset command phrase for the command "Run The Abel Office Works System" identified by button 502 in application screen 500.

Using the verbal utterance first word "The" 540, the SRE 150 determines that "The" is not a word in the command "Run Abel Demo System," and thus this command identified by button 508 is not a potential command match. "The" 540 is however present in each of the remaining commands supported by application screen 500: "Run The Abel Office Works System," "Run The Abel Office Ports System," and "Run The Abel Office Administration Suite".

Using the verbal utterance second word "Office" 550, the SRE 150 determines that "Office" 450 is present in each of the current command candidates supported by application screen 500: "Run The Abel Office Works System," "Run The Abel Office Ports System" and "Run The Abel Administration Suite".

As previously noted, in this example the UEI 140 used the OrderedSubset option 340 for all the commands supported by application screen 500 and thus, the fact that the word "Abel" is not in the user utterance 510 does not cause the utterance 510 to fail. "Office" 550 is in valid order after "The" 540 for each of the current command candidates.

Using the verbal utterance third word "Works" 560, the SRE 150 determines that "Works" is not present in the either the command "Run The Abel Office Ports System" or "Run The Abel Office Administration Suite," and thus these commands identified by buttons 504 and 506 respectively of application screen 500 are no longer command candidates. "Works" 560 is the next word after "Office" 550 in the command "Run The Abel Office Works System" and therefore, the SRE 150 identifies "Run The Abel Office Works System" as an application command for the user utterance "The Office Works System" 510.

As previously explained, the SRE 150 can generate one or more recognitions for a user utterance 110. In the example of FIG. 5B the SRE 150 generated the recognition "The Office Works System" for the user utterance "The Office Works System" 510. In this example the recognition is an exact match to the user utterance 510, and thus will generally be given a high recognition score as the likely guess for the user's utterance 510.

Assume that the SRE 150 generates a second recognition "The Office Ports System" for the user utterance "The Office Works System" 510. The SRE 150 may, for example, generate this second recognition because "Ports" and "Works" sound similar and/or because the user did not speak clearly. Applying the same basic logic flow as described with regard to FIG. 5B, the SRE 150 identifies "The Office Ports System" as a valid subset for the command "Run The Abel Office Ports System" identified by button 504 of FIG. 5A. This second recognition, however, is not an exact match to the user utterance 510, and thus will generally be given a lower recognition score than the recognition score assigned the recognition "The Office Works System".

In an embodiment the SRE 150 provides, or otherwise makes available, 180 the first recognition "The Office Works System" and its recognition score, as well as the identified application command for this recognition, "Run The Abel Office Works System," to the UEI 140. The SRE 150 will also provide, or otherwise make available, 180 the second recognition "The Office Ports System" and its recognition score, as well as the identified application command for this second recognition, "Run The Abel Office Ports System," to the UEI 140.

In an embodiment the UEI 140 will analyze the command information provided 180 by the SRE 150 and choose the application command associated with the recognition with the highest recognition score, i.e., the recognition with a recognition score that indicates the recognition is most likely the correct determination of the user's utterance 110. In this embodiment, and referring to the example of FIG. 5B, the UEI 140 will choose the "Run The Abel Office Works System" as the application command intended by the computing device user 115 as it is associated with the recognition that generally will have the higher score. The UEI 140 then provides 175 the chosen application command to the appropriate application 160 for processing. In an embodiment, if the chosen application command is internal to the intelligent speech recognition system 100, the UEI 140 processes the application command, or, alternatively, provides the application command to another component of the intelligent speech recognition system 100 for processing.

Figure 6A:
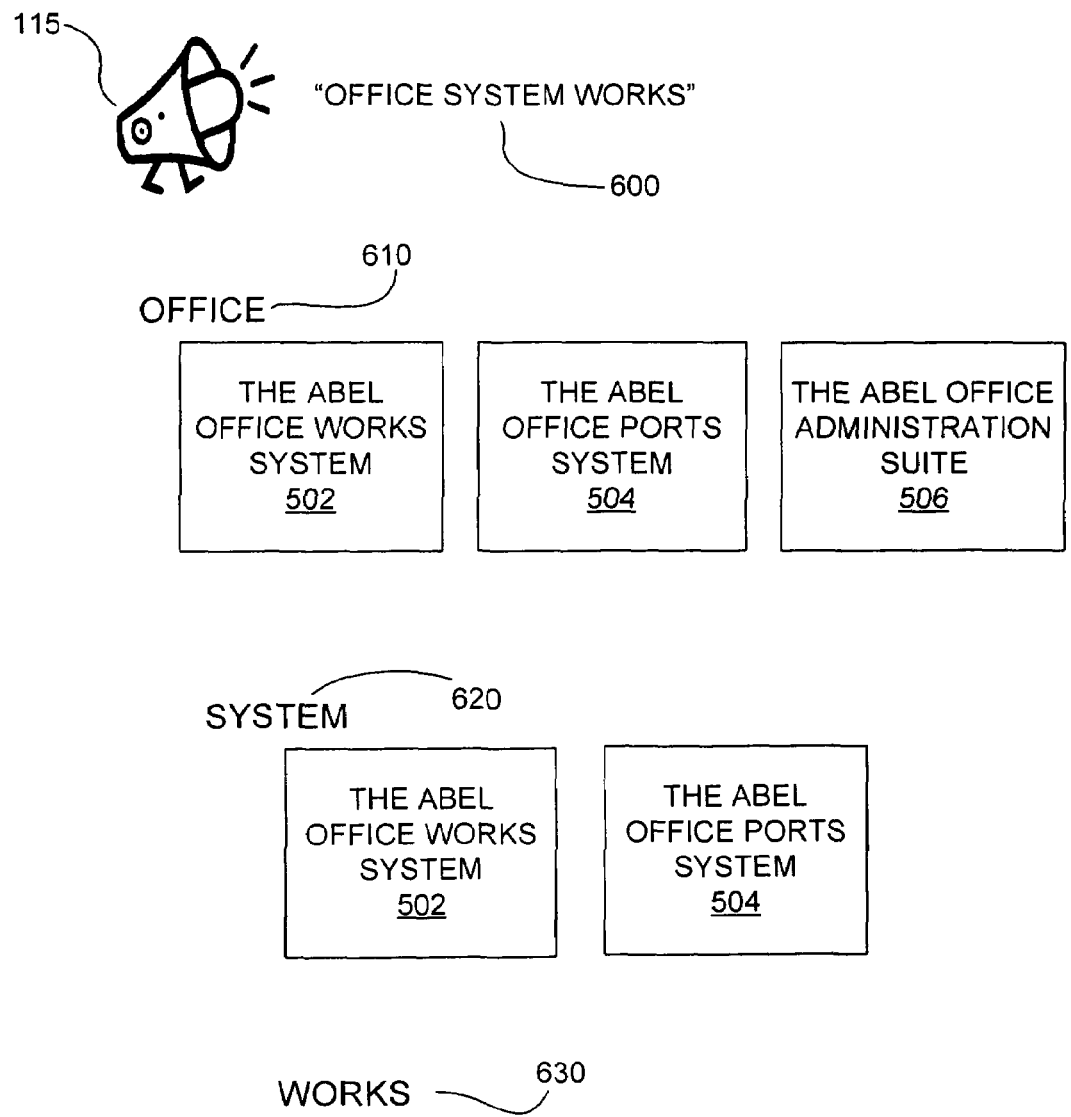
FIGS. 6A and 6B are exemplary processing flows involving invalid user utterances.

FIG. 6A shows an exemplary logic flow that an embodiment intelligent speech recognition system 100 follows upon receiving a user's invalid utterance 600. Assume a computing device user 115 utters the verbal command phrase "Office System Works" 600 in response to application screen 500 of FIG. 5A.

As previously discussed, application screen 500 of FIG. 5A identifies four Run commands: "Run The Abel Office Works System," "Run The Abel Office Ports System," "Run The Abel Office Administration Suite" and "Run Abel Demo System". Regardless of the option, 320, 330, 340, 350 or 360, used to define a CFG 155 for each of these commands, a user's utterance "Office System Works" 600 is invalid for at least the reason that its words are out of order for any of the commands identified in application screen 500.

For purposes of the example of FIG. 6A assume the OrderedSubset option 340 or the OrderedSubsetContentRequired option 360 was used for each of the commands identified by buttons 502, 504, 506 and 508 of FIG. 5A. In this case, valid subset command phrases are acceptable user utterances 110 for the commands identified in application screen 500.

Using the verbal utterance first word "Office" 610, the SRE 150 determines that Office" 610 is not a word in the command "Run Abel Demo System," and thus this command identified by button 508 of FIG. 5A is not a potential command match. "Office" 610 is present in each of the remaining commands identified in application screen 500: "Run The Abel Office Works System," "Run The Abel Office Ports System" and "Run The Abel Office Administration Suite". Although "Office" 610 is not the first command word for any of these commands, in an embodiment both the OrderedSubset option 340 and the OrderedSubsetContentRequired option 360 allow for "Office" 610 to be a valid first word in a respective user utterance 110 for any of these commands.

Using the verbal utterance second word "System" 620, the SRE 150 determines that "System" 620 is not a word in the command "Run The Abel Office Administration Suite," and thus this command is no longer a potential command match. "System" 620 is present in the two potential remaining commands supported by the application screen 500: "Run The Abel Office Works System" and "Run The Abel Office Ports System". And although "System" 620 is not the next consecutive word after "Office" 610 in either of these commands, the options OrderedSubset 340 and OrderedSubsetContentRequired 360, which each provide for skipped command words, accepts "System" 620 as a valid second word in a utterance 110 for the commands "Run The Abel Office Works System" and "Run The Abel Office Ports System".

Using the verbal utterance third word "Works" 630, the SRE 150 determines that "Works" 630 is not a word in the command "Run The Abel Office Ports System," and thus this command is no longer a command candidate. "Works" 630 is a word in the command "Run The Abel Office Works System". However, the word "Works" 630 does not follow the word "System" 620 in this command, and thus is out of order in the user utterance "Office System Works" 600. Consequently, there is no application command for the user utterance 600, and in an embodiment the SRE 150 notifies, or otherwise indicates to, 180 the UEI 140 that the user utterance 600 cannot be identified with an application command. In an embodiment the UEI 140 notifies 195 the user 115 that the utterance 600 cannot be matched to an application command.

If the example of FIG. 6A, if the verbal command phrase 600 is, alternatively, pre-recorded speech, in an aspect of an embodiment the UEI 140 indicates the failure to process in an error log. In another aspect of an embodiment where the verbal command phrase 600 is pre-recorded speech no error is indicated but no command is processed in response to the verbal command phrase 600.

Figure 6B:
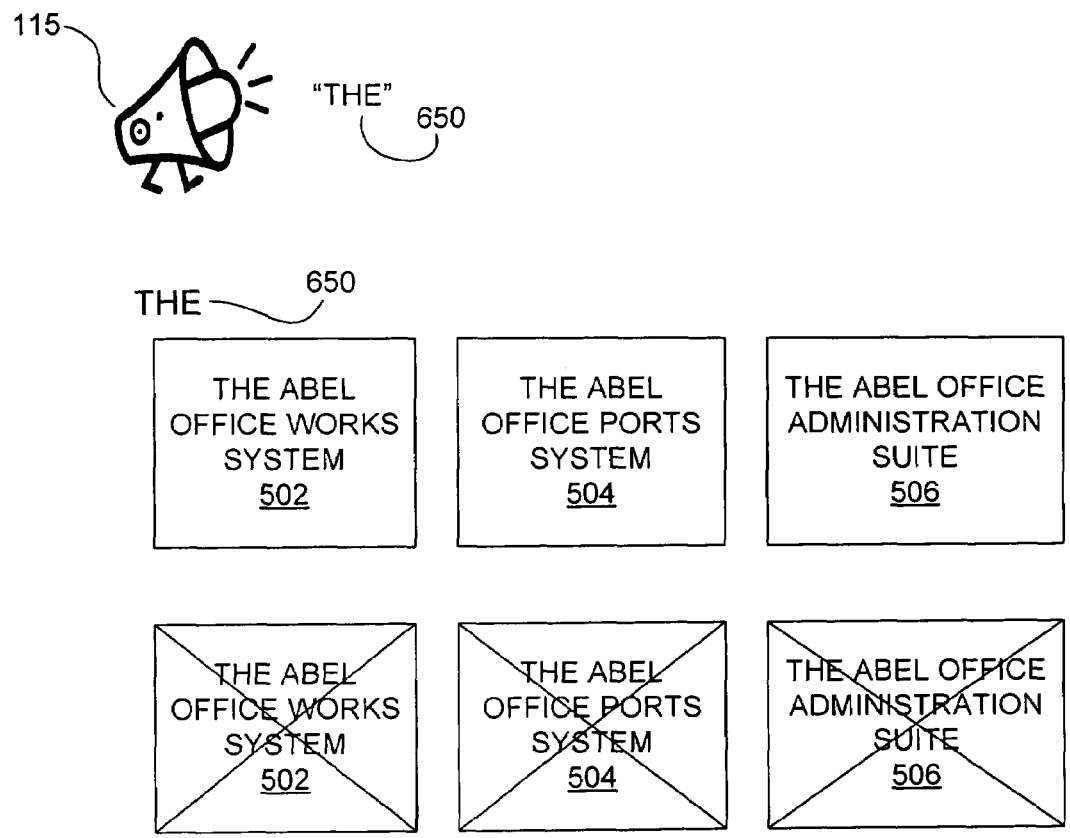

FIG. 6B shows a second exemplary logic flow that an embodiment intelligent speech recognition system 100 follows upon receiving a user's invalid utterance 650. Assume a computing device user 115 utters "The" 650 in response to application screen 500 of FIG. 5A. Also assume that "the" is identified as a subset blocking word.

For purposes of the example of FIG. 6B assume the SubsequenceContentRequired option 350 or the OrderedSubsetContentRequired option 360 was used in defining the CFG(s) 155 for each of the four commands identified by buttons 502, 504, 506 and 508 of FIG. 5A. In an embodiment both the SubsequenceContentRequired option 350 and the OrderedSubsetContentRequired option 360 require a user utterance 110 to include at least one non subset blocking command word. The user's utterance "The" 650 is therefore invalid in this example as it consists of only one subset blocking word.

Using the verbal utterance word "The" 650, the SRE 150 determines that "The" 650 is not a word in the command "Run Abel Demo System," and thus this command identified by button 508 in FIG. 5A is not a command candidate. "The" 650 is however present in each of the remaining commands supported by application screen 500: "Run The Abel Office Works System," "Run The Abel Office Ports System" and "Run The Abel Office Administration Suite".

The SRE 150, however, determines that there are no more words in the user utterance 650. In this example the SRE 150, using the subset blocking word list 165, determines that the user utterance "The" 650 is invalid for the remaining application command candidates. In an embodiment the SRE 150 notifies, or other indicates to, 180 the UEI 140 that it cannot match an application command to the invalid verbal command phrase "The" 650. In an embodiment the UEI 140 notifies 195 the user 115 that the utterance 650 cannot be matched to an application command.

If the example of FIG. 6B, if the verbal command phrase 650 is, alternatively, pre-recorded speech, in an aspect of an embodiment the UEI 140 indicates the failure to process in an error log. In another aspect of an embodiment where the verbal command phrase 650 is pre-recorded speech no error is indicated but no command is processed in response to the verbal command phrase 650.

Thus, there can be instances where the SRE 150 provides no recognition to the UEI 140 for an utterance 110. As well as the examples of FIGS. 6A and 6B, a user 115 may fail to speak clearly enough for the SRE 150 to be able to generate any recognition identifiable with any application command supported by the intelligent speech recognition system 100. In these cases, in an embodiment the SRE 150 notifies, or otherwise indicates to, 180 the UEI 140 that it has failed to produce a recognition for the user's current utterance 110. In an embodiment the UEI 140 notifies 195 the user 115 that the current utterance 110 cannot be processed.

If, alternatively, the SRE 150 can generate no recognition for a pre-recorded speech utterance, in an aspect of an embodiment the UEI 140 indicates the failure to process in an error log. In another aspect of an embodiment where the SRE 150 can generate no recognition for a pre-recorded speech utterance no error is indicated but no command is processed in response to the pre-recorded speech utterance.

Figure 7A:
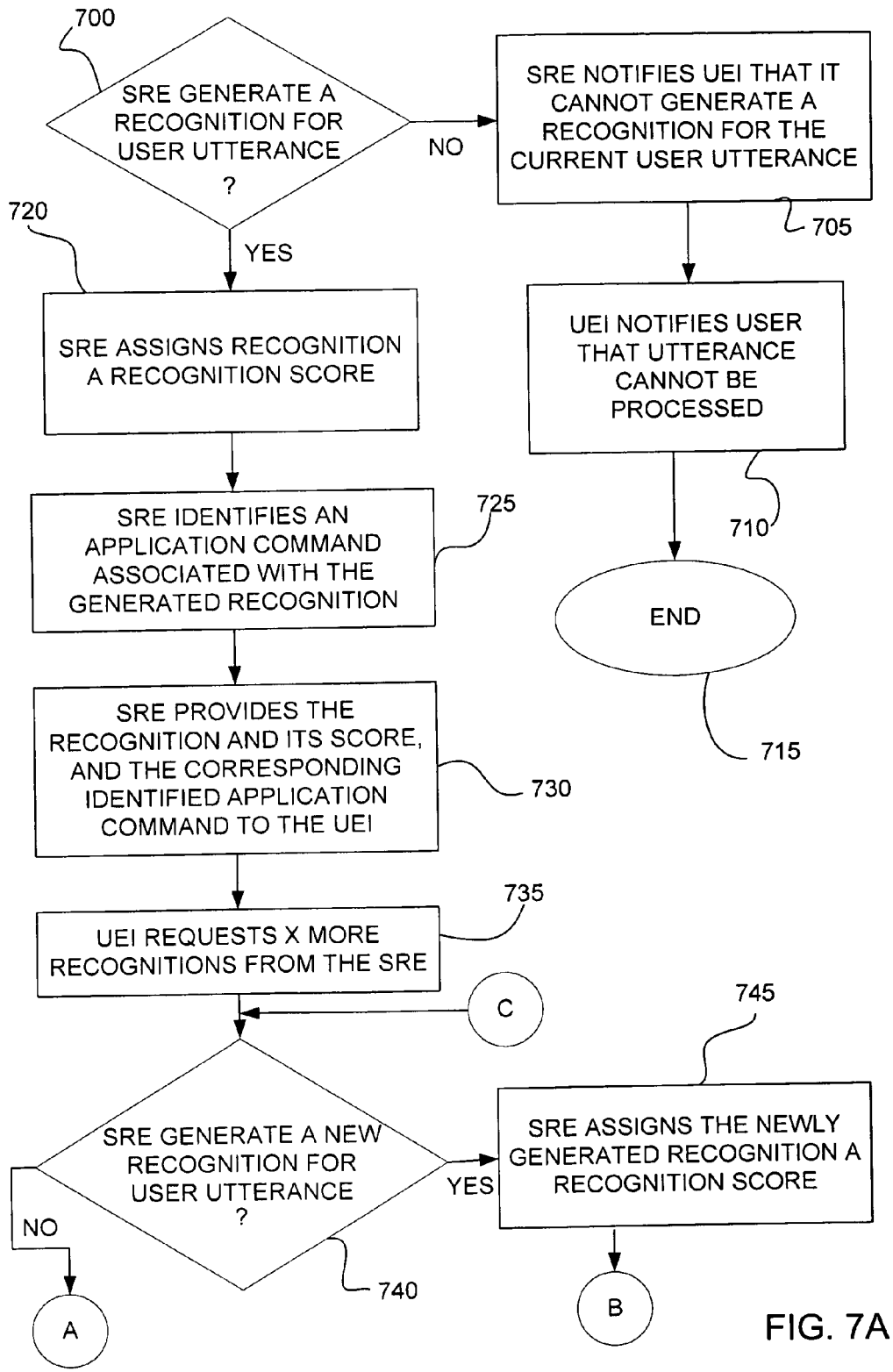
FIGS. 7A and 7B illustrate an embodiment logic flow for a methodology for processing a user's utterance, i.e., verbal command phrase, to try and identify the intended application command.
Figure 7B:
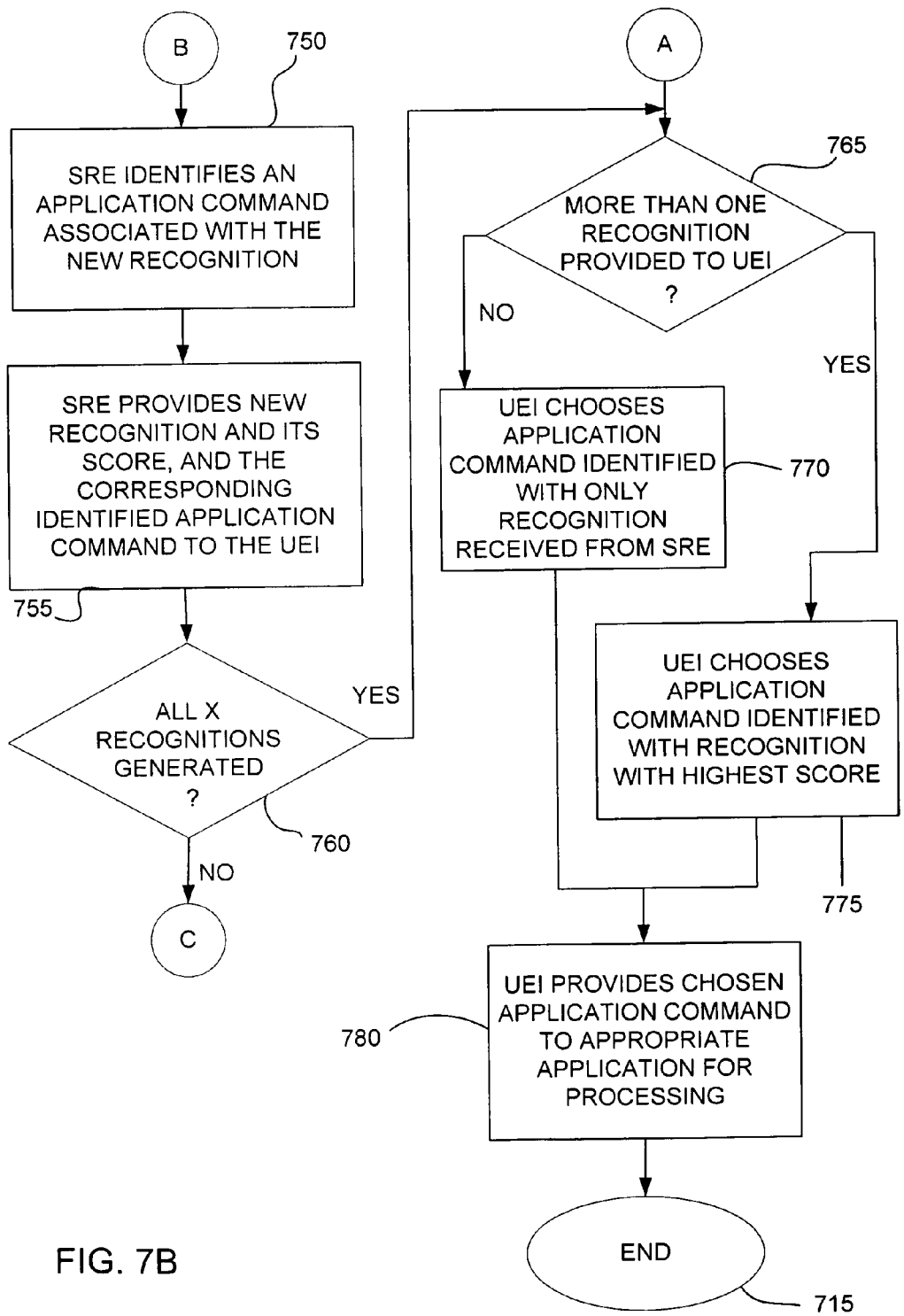

FIGS. 7A and 7B illustrate an embodiment logic flow for a methodology for identifying an application command from a user utterance 110. While the following discussion is made with respect to systems portrayed herein, the operations described may be implemented in other systems. Further, the operations described herein are not limited to the order shown. Additionally, in other alternative embodiments more or fewer operations may be performed.

Referring to FIG. 7A, a determination is made as to whether the SRE can generate, or otherwise create, a recognition for a current user utterance 700. If no, the SRE notifies, or otherwise indicates to, the UEI that it cannot generate a recognition for the current user utterance 705. The UEI then notifies the user that the current utterance cannot be processed 710, and the processing is ended for the current user utterance 715.

If, however, a determination is made that the SRE has generated a first recognition for the current user utterance, then the SRE assigns the first recognition a recognition score, which in an embodiment is an indication of how likely it is that the recognition is a correct representation of the user utterance 720. The SRE also identifies an application command associated with the generated recognition 725. The SRE provides the generated recognition and its score, as well as the identified associated application command, to the UEI 730.

In an embodiment, after receiving a first recognition from the SRE for a current user utterance, the UEI will request the SRE generate, or otherwise create x more recognitions for the utterance 735. In an embodiment x can be a number between five (5) and two hundred (200). In an alternative embodiment x can be a number between zero (0) and one thousand and twenty four (1024). In yet alternative embodiments x can be other values.

At decision block 740 a determination is made as to whether the SRE can generate, or otherwise create, a new recognition for the current user utterance. If yes, the SRE assigns the new recognition a recognition score 745. Referring to FIG. 7B, the SRE identifies an application command associated with the new recognition 750. The SRE provides the newly generated recognition and its score, as well as the identified associated application command, to the UEI 755.

At decision block 760 a determination is made as to whether the SRE has generated the requested x additional recognitions for the current user utterance. If no, referring back to FIG. 7A, at decision block 740 a determination is made as to whether the SRE can generate, or otherwise create, yet another new recognition for the current user utterance.

If at decision block 740 of FIG. 7A the SRE cannot generate a new recognition for the current user utterance, or at decision block 760 of FIG. 7B if all the x requested additional recognitions have been generated for the current user utterance, then at decision block 765 a determination is made as to whether more than one recognition was provided to the UEI by the SRE for the current user utterance.

If no, the UEI chooses the application command associated with the only recognition it has received from the SRE for the current user utterance 770. If, however, more than one recognition was provided to the UEI by the SRE for the current user utterance, the UEI chooses the application command identified with the recognition with the highest recognition score 775, i.e., associated with the most likely correct recognition. In an embodiment the UEI then provides the chosen application command to the appropriate application for processing 780 and the processing is ended for the current user utterance 715.

In an embodiment, if the chosen application command is internal to the intelligent speech recognition system 100, the UEI 140 processes the application command, or, alternatively, provides the application command to another component of the intelligent speech recognition system 100 for processing.

In an embodiment, a recognition generated, or otherwise created, by the SRE 150 and provided to the UEI 140 may indicate more than one application command because the user utterance 110 associated with the recognition is ambiguous. For example, assume an intelligent speech recognition system 100 supports the following two application commands for playing media, e.g., compact disc music stored on or otherwise accessible by the computing device: "Play Simply Blue Hits" and "Play Hits". Also assume that a user utterance for one of these commands is "Hits". If each of the application commands is defined by a CFG 155 with the subset option 340, then "Hits" is a valid user utterance for both the "Play Simply Blue Hits" and the "Play Hits" application commands.

In this situation of ambiguity, in an embodiment the intelligent speech recognition system 100 always inquires of the computing device user 115 which of the potential application commands was intended. In an aspect of this embodiment the UEI 140 of the intelligent speech recognition system 100 is tasked with interacting 195 with the computing device user 115 to clarify ambiguous user utterances 110.

In the present example, upon receiving the same recognition "Hits" associated with two application commands, "Play Hits" and "Play Simply Blue Hits," the UEI 140 will inquire of the user 115 which media choice, i.e., application command, was intended.

In an embodiment the UEI 140 interacts 195 with the user 115 via a screen display to clarify an ambiguous utterance 110. In an alternative embodiment the UEI 140 works with the SRE 150 to use audio to interact with the user 115 to clarify an ambiguous utterance 110. In still another alternative embodiment the UEI 140, in conjunction with the SRE 150, uses audio-visual prompts to interact with the user 115 to clarify an ambiguous utterance 110.

In an embodiment, to eliminate still further ambiguity with an already ambiguous utterance 110, the intelligent speech recognition system 100 requires the computing device user 115 to input an identification of the intended application command that is different from the user's utterance 110.

In an aspect of this embodiment the intelligent speech recognition system 100 requires a computing device user 115 to clarify an ambiguous utterance 110 by vocalizing a number, or a letter, displayed, or, alternatively, provided via an audio transmission, to the user 115 and which corresponds to the user's application command choice. For example, the speech recognition system 100 can require the user 115 to say "one" (1) if "Play Simply Blue Hits" is the user's intended media choice, and say "two" (2) if the user 115 intended "Play Hits" when they said "Hits".

In an alternative aspect of this embodiment the intelligent speech recognition system 100 requires a computing device user 115 to clarify an ambiguous utterance 110 by using a data input device, such as but not limited to, a keyboard or a mouse, to identify a number, or a letter, displayed, or, alternatively, provided via an audio transmission, to the user 115 and which corresponds to the user's application command choice. In the current example, in this alternative aspect of the embodiment the intelligent speech recognition system 100 can require the user 115 to input "1" (one) via, e.g., a keyboard if "Play Simply Blue Hits" is the intended media choice, and input "2" (two) via, e.g., a keyboard if the user 115 intended "Play Hits".

Upon the computing device user's clarification of the ambiguous utterance "Hits," the UEI 140 provides 175 the identified command, i.e., "Play Simply Blue Hits" or "Play Hits," to the respective application 160 for processing.

In a second embodiment where there is a situation of ambiguity regarding the application command a user 115 intended with their verbal utterance 110, if the ambiguous recognition is an exact match for an application command, the intelligent speech recognition system 100 will choose the exact match application command as the one intended by the user 115.

For example, "Play Hits" is a valid subset for the application command "Play Hits," and a valid subset for the application command "Play Simply Blue Hits". "Play Hits," however, is an exact match to the application command "Play Hits". In this example of a second embodiment where a recognition is an exact match to an application command, but the recognition is ambiguous in that it could also refer to at least one other application command, the UEI 140 will choose the exact match application command, i.e., "Play Hits" as the command to be forwarded to the appropriate application 160 for processing.

In yet a third embodiment, upon generating an ambiguous recognition for one or more application commands, the intelligent speech recognition system 100 chooses the most common, i.e., most frequently used, application command identified with the ambiguous recognition as the intended application command. In an aspect of this embodiment the UEI 140 of the intelligent speech recognition system 100 is tasked with identifying the most common command choice of the potential application commands for an ambiguous user utterance 110. In support of this task, in an aspect of this embodiment the UEI 140 tracks the frequency of use of the command choices for the various application screens, or user interfaces, supported by the intelligent speech recognition system 100, i.e., tracks how often a computing device user 115 selects each command speech-enabled by the intelligent speech recognition system 100.

In this aspect of this third embodiment, upon receiving a recognition from the SRE 150 that identifies two or more application commands, the UEI 140 determines the most common application command of the two or more application commands and provides 175 the most common application command to the respective application 160 for processing.

Figure 8A:
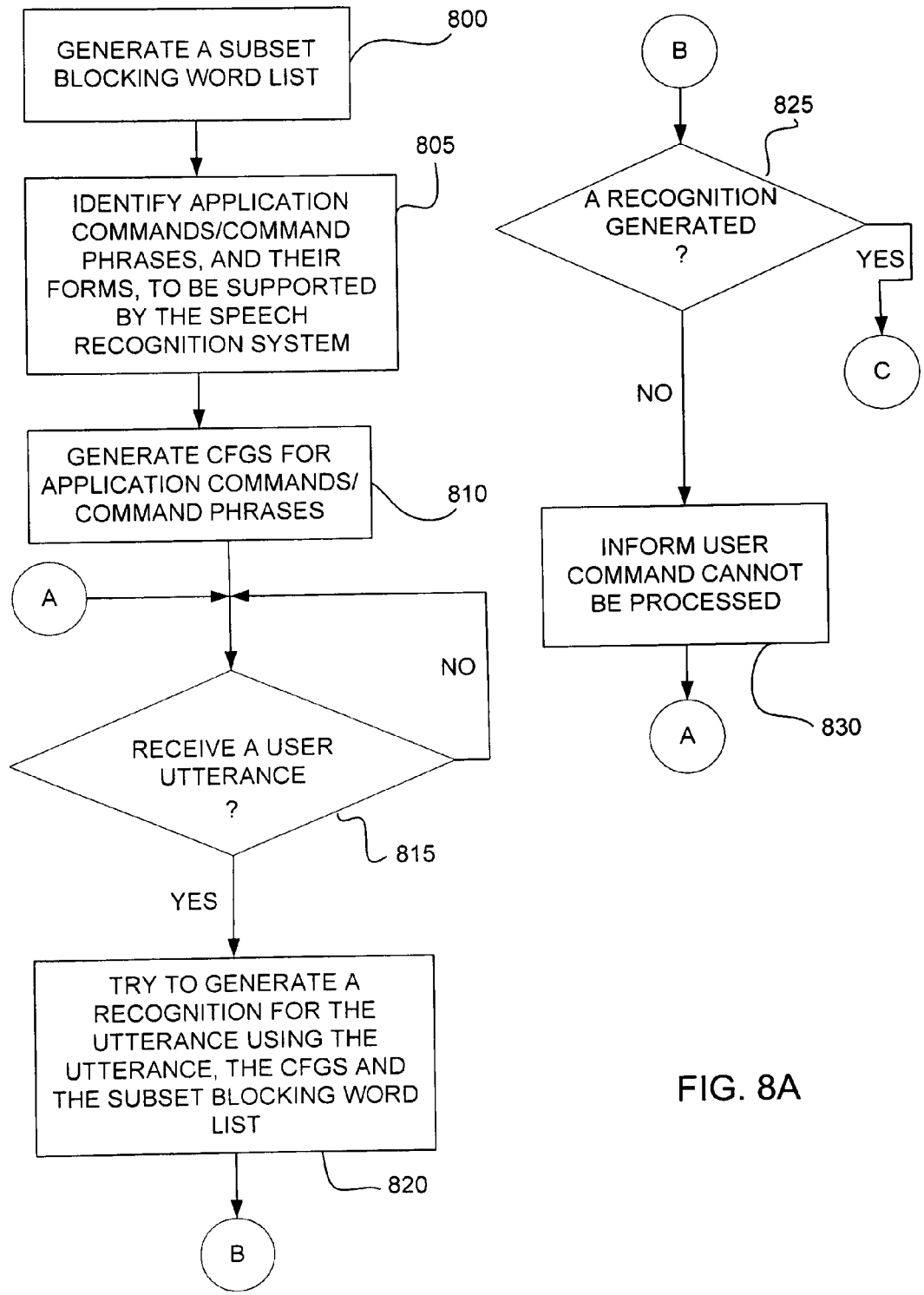
FIGS. 8A, 8B and 8C illustrate an embodiment logic flow for a methodology for intelligent speech recognition.
Figure 8B:
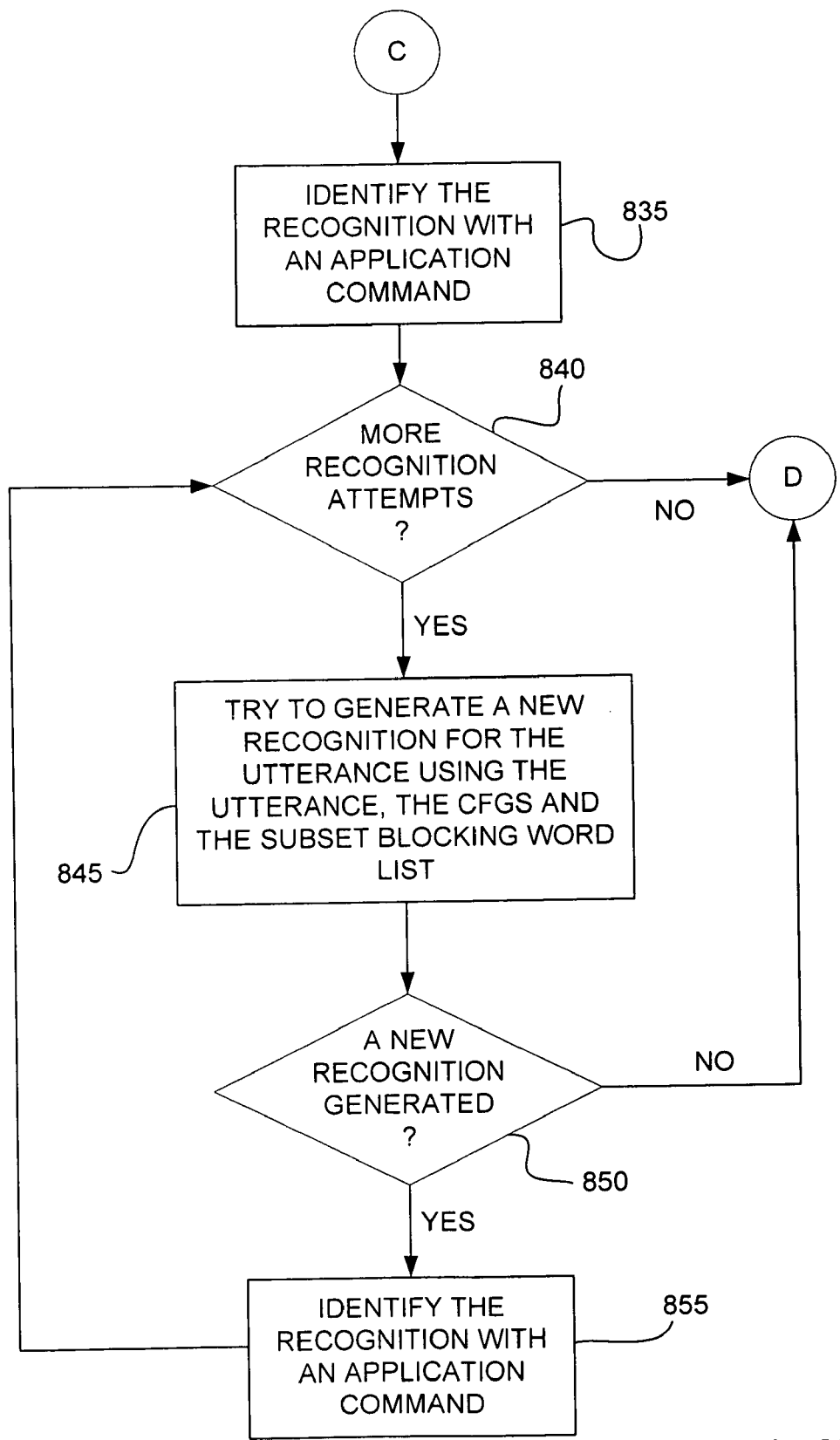
Figure 8C:
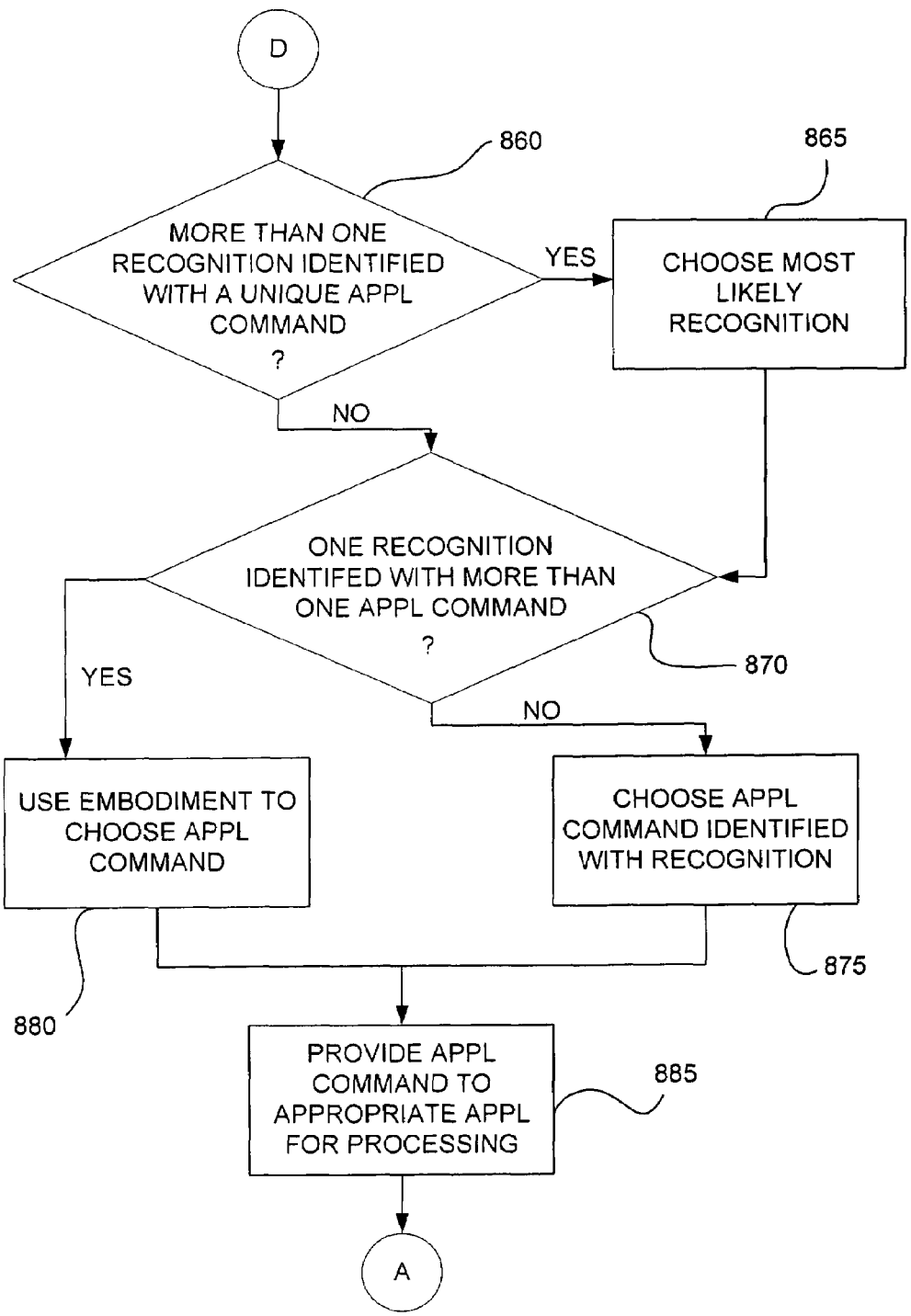

FIGS. 8A, 8B and 8C illustrate an embodiment logic flow for a methodology for intelligent speech recognition. While the following discussion is made with respect to systems portrayed herein, the operations described may be implemented in other systems. Further, the operations described herein are not limited to the order shown. Additionally, in other alternative embodiments more or fewer operations may be performed.

Referring to FIG. 8A, in an embodiment the intelligent speech recognition system generates a subset blocking word list 800. In an embodiment the subset blocking word list 165 identifies subset blocking words, including words that identify punctuation marks and various symbols of the language of the applications 160 supported by the intelligent speech recognition system 100.

In an embodiment the intelligent speech recognition system identifies the application commands and command phrases it will support and the acceptable verbal command phrase forms, e.g., complete command, command subsequences, command subsets, etc., for these application commands and command phrases 805. In an embodiment the UEI 140 of the intelligent speech recognition system 100 identifies the system-supported application commands and command phrases, and their respective acceptable verbal command phrase forms via options 320 (Allwords), 330 (Subsequence), 340 (OrderedSubset), 350 (SubsequenceContentRequired) and 360 (OrderedSubsetContentRequired).

In an embodiment the intelligent speech recognition system generates one or more CFGs for the application commands and command phrases it supports 810. In an embodiment the UEI 140 of the intelligent speech recognition system 100 specifies a CFG 155 for one or more application commands to the SRE 150, for use in identifying application commands from user utterances 110.

In an embodiment the intelligent speech recognition system 100 monitors the application 160 in focus, i.e., that is currently processing, and for which a user 115 is vocalizing command phrases 110, and dynamically regenerates one or more CFGs 155 for the current user interface, i.e., current application window being displayed to a user 115.

In an embodiment the intelligent speech recognition system 100 can also, or alternatively, gather application command information from applications 160 that are supported by the system 100, but are not the application 160 currently in focus, to dynamically regenerate one or more CFGs 155 as needed.

At decision block 815 a determination is made as to whether the intelligent speech recognition system has received a user utterance. If no, the intelligent speech recognition system continues to check if a user has vocalized a command phrase 815.

If at decision block 815 a determination is made that the intelligent speech recognition system has received a user utterance then in an embodiment the intelligent speech recognition system attempts to generate, or otherwise create, a recognition for the utterance 820. In an embodiment, the SRE 150 of the intelligent speech recognition system 100 attempts to generate a recognition for a user utterance 110 using the user utterance 110, one or more CFGs 155 and the subset blocking word list 165.

At decision block 825 a determination is made as to whether or not the intelligent speech recognition system has been successful in its attempt to generate a recognition for the current user utterance. If no, in an embodiment, the intelligent speech recognition system notifies the user that the current verbal command phrase, i.e., utterance, cannot be processed 830, and the intelligent speech recognition system goes back to decision block 815 to make a determination as to whether there is a new utterance from a user to be processed.

If, however, at decision block 825 the intelligent speech recognition system has been successful in its attempt to generate a recognition for the current user utterance then, referring to FIG. 8B, the intelligent speech recognition system identifies the recognition with an application command supported by the system 835. In an embodiment, upon generating a recognition for a user utterance 110, the SRE 150 passes, or otherwise provides, 180 the recognition and the associated application command identified with the recognition to the UEI 140 for further processing.

At decision block 840 a determination is made as to whether or not the intelligent speech recognition system should make more attempts at generating, or otherwise creating, more recognitions for the current user utterance. In an embodiment, upon receiving a recognition and associated application command for a user utterance 110 from the SRE 150, the UEI 140 requests the SRE 150 make x more attempts at generating, or creating, recognitions for the current user utterance 110. In an embodiment x can be a number between five (5) and two hundred (200). In an alternative embodiment, x can range from zero (0) to one thousand and twenty four (1024). In yet alternative embodiments, x can be other values.

If there are still more recognition attempts to be made for the current user utterance, then the intelligent speech recognition system will try to generate, or otherwise create, a new recognition for the current utterance 845. In an embodiment the SRE 150 of the intelligent speech recognition system 100 attempts to generate a new recognition for the current user utterance 110 using the user utterance 110, one or more CFGs 155 and the subset blocking word list 165.

At decision block 850 a determination is made as to whether the intelligent speech recognition system was successful in its latest attempt at generating a new recognition for the current user utterance. If yes, the intelligent speech recognition system identifies the new recognition with an application command supported by the system 855. In an embodiment, upon generating a new recognition for a user utterance 110, the SRE 150 passes, or otherwise provides, 180 the recognition and the associated application command identified with the recognition to the UEI 140 for further processing. The intelligent speech recognition system then cycles back to decision block 840, where a determination is made as to whether or not the intelligent speech recognition system should make more attempts at generating, or otherwise creating, more recognitions for the current user utterance.

If at decision block 840 it is determined that no more attempts at generating recognitions for the current user utterance need be made, i.e., the requested number of attempts have been processed, then referring to FIG. 8C, at decision block 860 a determination is made as to whether more than one recognition is identified with a unique application command. Likewise, at decision block 850 if it is determined that a new recognition for the current user utterance cannot be generated, i.e., the intelligent speech recognition system cannot generate any more recognitions for the current user utterance, then again referring to FIG. 8C, at decision block 860 a determination is made as to whether more than one recognition is identified with a unique application command.

In an embodiment the SRE 150 can send, or otherwise provide, 180 the UEI 140 more than one recognition associated with a unique application command. For example, referring back to FIG. 5A, assume each of the commands "Run The Abel Office Works System" "Run The Abel Office Ports System," "Run The Abel Office Administration Suite" and "Run The Abel Demo System" are defined in one or more CFGs 155 with the OrderedSubset option 340. Also assume that a user utters the verbal command phrase "Run The Abel Office Works" in response to application screen 500. In this example, the SRE 150 can generate a first recognition for this utterance, "Run The Abel Office Works" that is a valid subset for the application command "Run The Abel Office Works System". The SRE 150 can then generate a second recognition for this utterance, "Run The Abel Office Ports" that is a valid subset for the application command "Run The Abel Office Ports System". In this example, both recognitions, each associated with different, unique, application commands, will be provided by the SRE 150 to the UEI 140 for further processing.

Referring back to FIG. 8C, if at decision block 860 it is determined that more than one recognition for the current user utterance is identified with a unique application command then the intelligent speech recognition system chooses the most likely recognition, i.e., the recognition that is deemed to be the best guess for what the user actually uttered 865.

In an embodiment the SRE 150 assigns a recognition score to each recognition, which is an indication of how likely correct the SRE 150 deems the recognition to be. In an embodiment, the higher the recognition score, the more likely the recognition is the correct representation of the user's utterance 110. In an embodiment, upon receiving more than one recognition associated, or otherwise identified, with a unique application command, the UEI 140 will choose the recognition with the highest score.

At decision block 870 a determination is made as to whether one recognition identifies more than one application command, i.e., whether there is ambiguity as to the command a user intended with their verbal command phrase. For example, assume an intelligent speech recognition system 100 supports the following two application commands for playing media: "Play Simply Blue Hits" and "Play Hits". Also assume that a user utterance for one of these commands is "Play Hits". If each of the application commands is defined by a CFG 155 with the subset option 340, then "Play Hits" is a valid user utterance for both the "Play Simply Blue Hits" and the "Play Hits" application commands. In this example, the SRE 150 can generate a recognition "Play Hits" and associate it with the application command "Play Hits". The SRE 150 can also associate the recognition "Play Hits" with the application command "Play Simply Blue Hits". In an embodiment, the SRE 150 provides 180 the recognition "Play Hits" and the associated application command "Play Hits" to the UEI 140 for further processing. In an embodiment the SRE 150 also provides 180 the recognition "Play Hits" and the associated application command "Play Simply Blue Hits" to the UEI 140 for further processing. In this example the UEI 140 now has one recognition that is associated with two different application commands.

In an embodiment, if one recognition identifies more than one application command, i.e., there is command ambiguity, then the intelligent speech recognition uses an embodiment to choose the application command intended by the user and which should be processed 880. One embodiment for resolving command ambiguity is for the intelligent speech recognition system to ask the user to identify which of the application commands associated with the recognition is the one that was intended.

In a situation of command ambiguity, if one application command is an exact match to the recognition, e.g., the "Play Hits" command is an exact match to the recognition "Play Hits," then in a second embodiment the intelligent speech recognition system chooses the exact match application command, e.g., "Play Hits" rather than "Play Simply Blue Hits," as the application command intended by the user utterance.

In a third embodiment for handling command ambiguity, the intelligent speech recognition system will choose the application command associated with the recognition that is most frequently requested by a user of the system. Thus, for example, if "Play Simply Blue Hits" is requested by a user more often then "Play Hits," then upon the command ambiguity for the recognition "Play Hits," the intelligent speech recognition system will choose "Play Simply Blue Hits" as the intended application command.

If at decision block 870 it is determined that there is no recognition that identifies more than one application command, i.e., there is no command ambiguity, then the intelligent speech recognition system chooses the application command identified with the most likely recognition 875.

In an embodiment the intelligent speech recognition system provides the chosen application command for the user utterance to the appropriate application for processing 885, and returns to decision block 815 of FIG. 8A to determine if there is a new user utterance to be processed.

In an embodiment, if the application command is internal to the intelligent speech recognition system then the intelligent speech recognition system processes the command 885.

Subset Blocking Word List

As previously discussed, in an embodiment the SRE 150 generates a subset blocking word list 165, also referred to herein as an SBW list 165. In an embodiment the subset blocking word list 165 is a linked list. In an alternative embodiment the subset blocking word list 165 is a hash table. In still other alternative embodiments the subset blocking word list 165 is stored in various other structures, including but not limited to, tables, or identified via other forms, including, but not limited to, one or more definitions that identify the items in the subset blocking word list 165.

In an embodiment subset blocking words are words that in and of themselves do not provide meaningful insight into the subject matter of a user utterance 110, e.g., but not limited to, prepositions, e.g., "in," "at," "like," "of," etc. In this embodiment, conversely, content words are words that are not deemed subset blocking words.

In a second embodiment subset blocking words are words of the language of the application commands supported by the intelligent speech recognition system 100 that are identified as short in length and frequently used in the language and that are deemed to be able to easily be mistaken for, or otherwise matched to, user utterance mumbles. For example, "the" is a word in the English language that is short and frequently used and can easily match users' poor articulations, i.e., mumbles, of other English language words.

In a third embodiment subset blocking words are words of the language of the application commands supported by the intelligent speech recognition system 100 that are identified as short in length and that are deemed to be able to easily be mistaken for, or otherwise matched to, user utterance mumbles.

In yet other alternative embodiments subset blocking words can be defined, or otherwise identified by more, less or other criteria and/or combinations of criteria.

In an embodiment a subset blocking word can be a word or word phrase that identifies punctuation, e.g., "colon" for :. In an embodiment a subset blocking word can be a word or word phrase that identifies a symbol, e.g., "dollar sign" for $.

Figure 9:
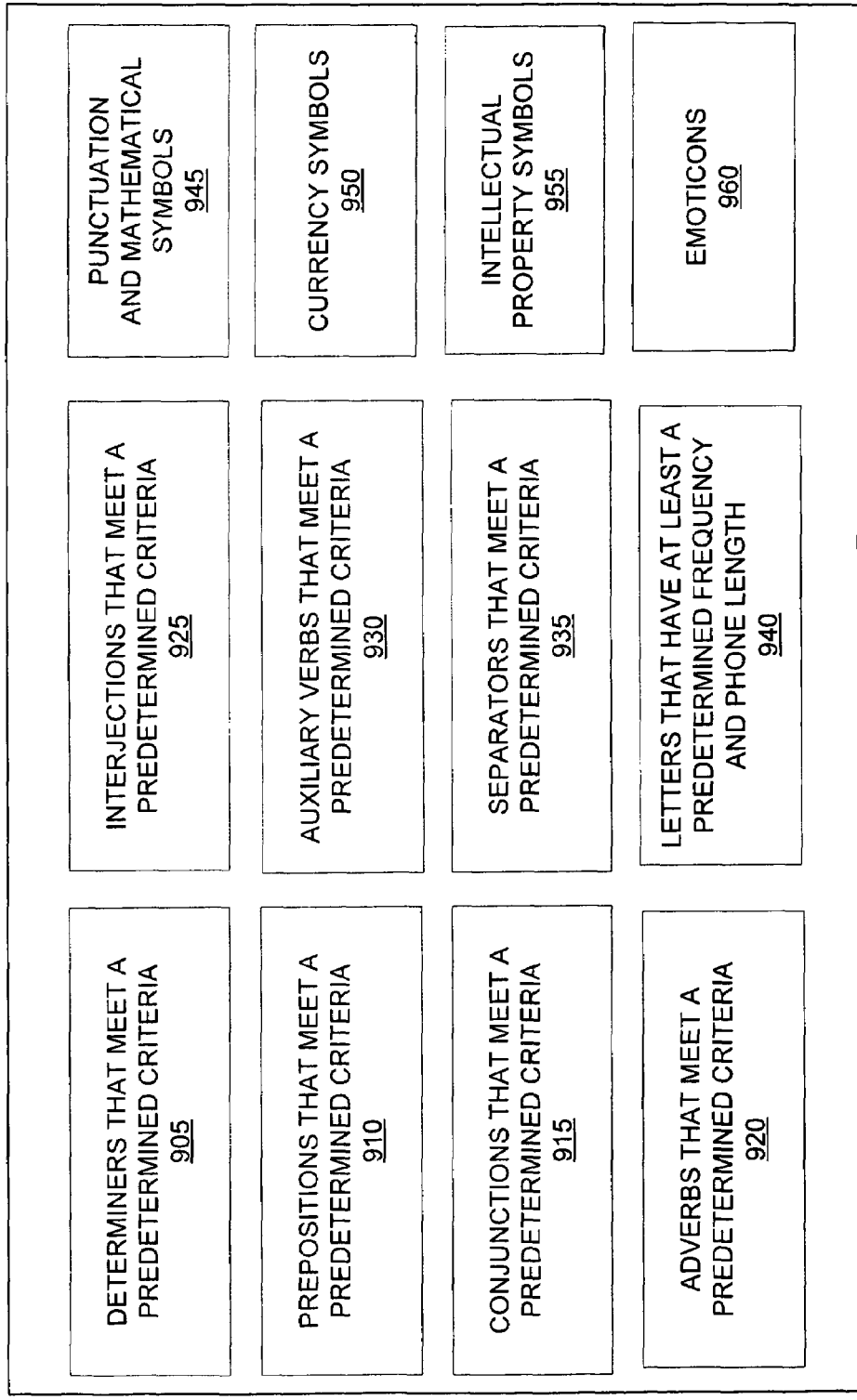
FIG. 9 depicts elements of an embodiment subset blocking word list.

FIG. 9 depicts an embodiment SBW list 165. The embodiment SBW list 165 contains determiner words that have at least a predetermined frequency value and no more than a predetermined phonemic length 905.

A determiner is a noun modifier that expresses the reference of a noun or noun phrase in context. Exemplary determiners in the English language include, but are not limited to, "a," "an," "the," "this," "that," "his," "her," "our," "all," "few," "many," etc.

In an embodiment a determiner is included in the SBW list 165 if it has at least a predetermined frequency, i.e., if its occurrence in the language of the commands supported by the intelligent speech recognition system 100 is at least as often as an identified frequency, and its phonemic length, i.e., the number of smallest acoustic units of the determiner word, is no more than a specified amount.

In an embodiment the predetermined frequency value of a word, or letter, is a log likelihood value derived from the language model unigram list, which essentially enables the SRE 150 to sort words, and letters, according to the frequency that they are seen in a respective language model training text. In an embodiment a language model training text is a collection of free running text from a variety of written sources such as, but not limited to, text books, news articles, magazine articles, encyclopedias, manuals, and emails, that in an embodiment collectively amounts to anywhere between five million and billions of words in size.

In an aspect of this embodiment a determiner is included in the SBW list 165 if its frequency value is at least negative four (−4) and its phonemic length is no more than four (4), or if its frequency value is at least negative seven (−7) and its phonemic length is no more than three (3). In some alternative aspects of this embodiment other frequency values and/or phonemic lengths are used to identify determiners for the SBW list 165. In other alternative aspects of this embodiment one or more other and/or additional measures are used to identify determiners for the SBW list 165.

The embodiment SBW list 165 also contains preposition words that have at least a predetermined frequency value and no more than a predetermined phonemic length 910.

A preposition links nouns, pronouns and phrases to other words in a phrase or sentence. Exemplary prepositions in the English language include, but are not limited to, "about," "at," "but," "by," "despite," "for," "from," "in," "near," "of," "on," etc.

In an embodiment a preposition is included in the SBW list 165 if it has at least a predetermined frequency and its phonemic length is no more than an identified amount. In an aspect of this embodiment a preposition is included in the SBW list 165 if its frequency value is at least negative four (−4) and its phonemic length is no more than four (4), or if its frequency value is at least negative seven (−7) and its phonemic length is no more than three (3). In some alternative aspects of this embodiment other frequency values and/or phonemic lengths are used to identify prepositions for the SBW list 165. In other alternative aspects of this embodiment one or more other and/or additional measures are used to identify prepositions for the SBW list 165.

In an embodiment the SBW list 165 contains conjunction words that have at least a predetermined frequency value and no more than a predetermined phonemic length 915.

Conjunctions link words, phrases and clauses in a phrase or sentence. Exemplary conjunctions in the English language include, but are not limited to, "and," "because," "if," "until," "where," etc.

In this embodiment a conjunction is included in the SBW list 165 if it has at least a predetermined frequency and its phonemic length is no more than an identified amount. In an aspect of this embodiment a conjunction is included in the SBW list 165 if its frequency value is at least negative four (−4) and its phonemic length is no more than four (4), or if its frequency value is at least negative seven (−7) and its phonemic length is no more than three (3). In some alternative aspects of this embodiment other frequency values and/or phonemic lengths are used to identify conjunctions for the SBW list 165. In other alternative aspects of this embodiment one or more other and/or additional measures are used to identify conjunctions for the SBW list 165.

The embodiment SBW list 165 contains adverb words that have at least a predetermined frequency value and no more than a predetermined phonemic length 920.

Adverbs modify verbs, adjectives, other adverbs, phrases or clauses. Generally, an adverb indicates manner, time, place, cause, or degree, and answers questions such as "how," "when" and "where". Exemplary adverbs in the English language include, but are not limited to, "quickly," "patiently," "boldly," "loudly," etc.

In this embodiment an adverb is included in the SBW list 165 if it has at least a predetermined frequency and its phonemic length is no more than an identified amount. In an aspect of this embodiment an adverb is included in the SBW list 165 if its frequency value is at least negative four (−4) and its phonemic length is no more than four (4), or if its frequency value is at least negative seven (−7) and its phonemic length is no more than three (3). In some alternative aspects of this embodiment other frequency values and/or phonemic lengths are used to identify adverbs for the SBW list 165. In other alternative aspects of this embodiment one or more other and/or additional measures are used to identify adverbs for the SBW list 165.

The embodiment SBW list 165 includes interjection words that have at least a predetermined frequency value and no more than a predetermined phonemic length 925.

An interjection is a word used to convey emotion. Exemplary interjections in the English language include, but are not limited to, "hey," "ouch," "yuck," etc.

In this embodiment an interjection is included in the SBW list 165 if it has at least a predetermined frequency and its phonemic length is no more than an identified amount. In an aspect of this embodiment an interjection is included in the SBW list 165 if its frequency value is at least negative four (−4) and its phonemic length is no more than four (4), or if its frequency value is at least negative seven (−7) and its phonemic length is no more than three (3). In some alternative aspects of this embodiment other frequency values and/or phonemic lengths are used to identify interjections for the SBW list 165. In other alternative aspects of this embodiment one or more other and/or additional measures are used to identify interjections for the SBW list 165.

In an embodiment the SBW list 165 contains auxiliary verb words that have at least a predetermined frequency value and no more than a predetermined phonemic length 930.

An auxiliary verb combines with another verb to help form the tense, mood, voice or condition of the verb it is linked with. Exemplary auxiliary verbs in the English language include, but are not limited to, "will," "would," "can," "may," etc.

In an embodiment SBW list 165 an auxiliary verb is included if it has at least a predetermined frequency and its phonemic length is no more than an identified amount. In an aspect of this embodiment an auxiliary verb is included in the SBW list 165 if its frequency value is at least negative four (−4) and its phonemic length is no more than four (4), or if its frequency value is at least negative seven (−7) and its phonemic length is no more than three (3). In some alternative aspects of this embodiment other frequency values and/or phonemic lengths are used to identify auxiliary verbs for the SBW list 165. In other alternative aspects of this embodiment one or more other and/or additional measures are used to identify auxiliary verbs for the SBW list 165.

The embodiment SBW list 165 includes separator words that have at least a predetermined frequency value and no more than a predetermined phonemic length 935.

In an embodiment separators are words that modify or otherwise provide a new meaning in combination with a verb. In this embodiment the meaning of the combination verb/separator cannot be straightforwardly inferred from the meaning of the verb and the meaning of the separator. An exemplary separator in the English language is "up" in the verb-separator combination "make up".

In an embodiment SBW list 165 a separator is included if it has at least a predetermined frequency and its phonemic length is no more than an identified amount. In an aspect of this embodiment a separator is included in the SBW list 165 if its frequency value is at least negative four (−4) and its phonemic length is no more than four (4), or if its frequency value is at least negative seven (−7) and its phonemic length is no more than three (3). In some alternative aspects of this embodiment other frequency values and/or phonemic lengths are used to identify separators for the SBW list 165. In other alternative aspects of this embodiment one or more other and/or additional measures are used to identify separators for the SBW list 165.

An embodiment SBW list 165 includes letters, e.g., "A," "B," "C," etc., that have at least a predetermined frequency value and no more than a predetermined phonemic length 940.

In an aspect of this embodiment a letter is included in the SBW list 165 if its frequency value is at least negative four (−4) and its phonemic length is no more than four (4), or if its frequency value is at least negative seven (−7) and its phonemic length is no more than three (3). In some alternative aspects of this embodiment other frequency values and/or phonemic lengths are used to identify letters for the SBW list 165. In other alternative aspects of this embodiment one or more other and/or additional measures are used to identify letters for the SBW list 165.

An embodiment SBW list 165 identifies punctuation and mathematical symbols 945. Exemplary punctuation in an embodiment SBW list 165 includes, but is not limited to, a period (.), a comma (,), a question mark (?), etc. Exemplary mathematical symbols in an embodiment SBW list 165 include, but are not limited to, plus, or plus sign (+), minus, or minus sign (−), and equals, or equal sign (=), etc.

An embodiment SBW list 165 identifies currency symbols 950. Exemplary currency symbols in an embodiment SBW list 165 include, but are not limited to, dollar ($), cents (¢), etc.

An embodiment SBW list 165 identifies intellectual property symbols 955. Exemplary intellectual property symbols include, but are not limited to, trademark (™), registered (®), etc.

An embodiment SBW list 165 identifies emoticon symbols 960. In an embodiment emoticons are symbols that denote emotions. Exemplary emoticons include the smiley face (☺), the frown face (☹), etc.

In alternative embodiments more, less and/or other categories of words, symbols and/or punctuation are contained in the SBW list. For example, in an alternative embodiment the category of letters is not included in the SBW list. As another example, in an alternative embodiment the category of intellectual property symbols is not included in the SBW list. In still another example, in an alternative embodiment the category of adjectives meeting predefined frequency values and phonemic lengths is included in the SBW list.

Figure 10:
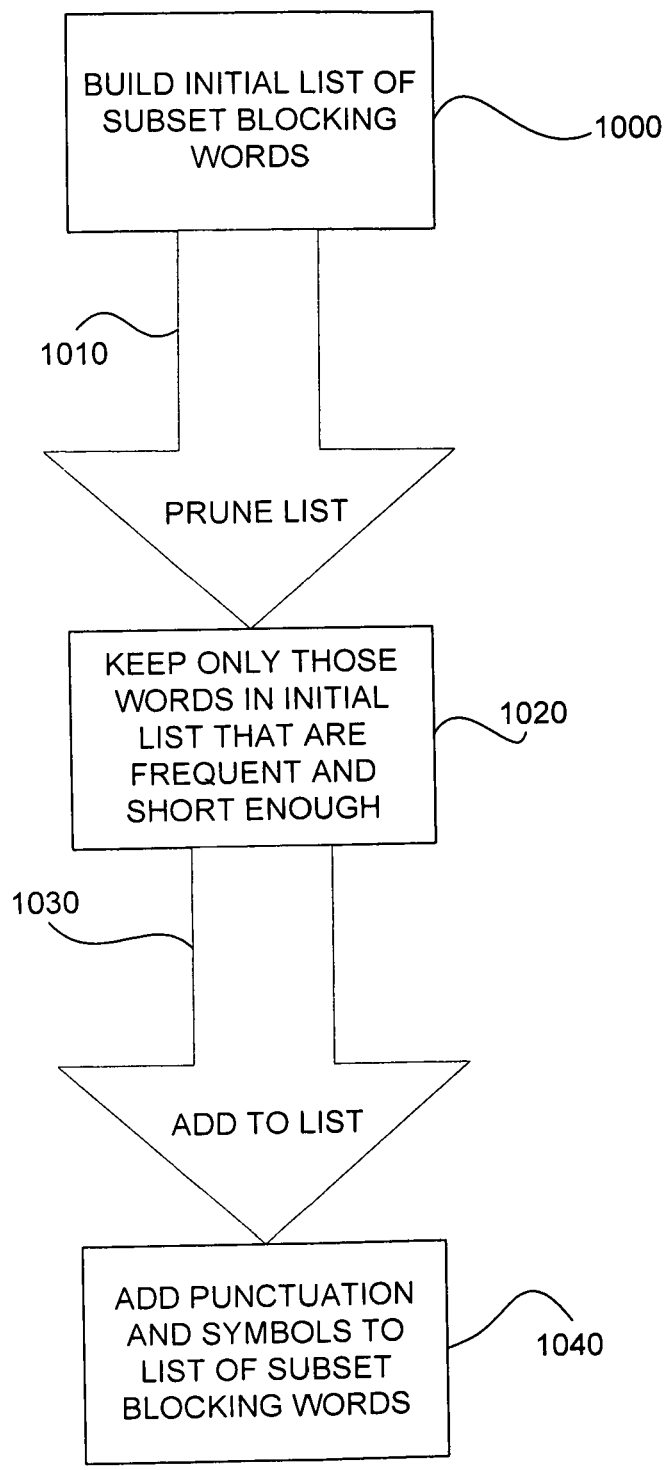
FIG. 10 illustrates a general embodiment logic flow for a methodology for creating an embodiment subset blocking word list.

FIG. 10 illustrates a general embodiment logic flow for a methodology for creating an embodiment SBW list 165. While the following discussion is made with respect to systems portrayed herein, the operations described may be implemented in other systems. Further, the operations described herein are not limited to the order shown. Additionally, in other alternative embodiments more or fewer operations may be performed.

In FIG. 10 the intelligent speech recognition system builds an initial list of subset blocking words 1000, i.e., builds an initial SBW list 1000. In an embodiment the contents of the initial SBW list are words of pre-specified categories, such as, but not limited to, adverbs and prepositions, and the letters of the language of the commands supported by the intelligent speech recognition system, collectively referred to as word categories. In an embodiment the contents of the initial SBW list also include the most frequent words from the language's dictation language model, i.e., unigram list. In an embodiment the intelligent speech recognition system includes the one-hundred (100) most frequently used words in the language of the commands that it supports in the initial SBW list.

In alternative embodiments various combinations of word categories and/or the number of the most frequently used words of the supported language are included in the initial SBW list. For example, in an alternative embodiment adverbs are not included in the initial SBW list and only the fifty (50) most frequently used words in the language of the commands supported by the intelligent speech recognition system are included in the initial SBW list.

Once the initial SBW list is built 1000, in an embodiment the intelligent speech recognition prunes the initial list 1010 by removing, or otherwise deleting or ignoring, one or more words and/or letters in the initial list. In an embodiment the words and letters from the initial SBW list that are used frequently enough in the supported command language and are short enough as determined by predefined criteria are kept on the SBW list 1020, while all others are pruned 1010, or otherwise removed, deleted or ignored, from the initial SBW list.

In an embodiment the intelligent speech recognition system adds to the initial SBW list 1030. In an embodiment the intelligent speech recognition system adds punctuation and predetermined categories of symbols to the SBW list 1040 to generate the final SBW list.

Figure 11A:
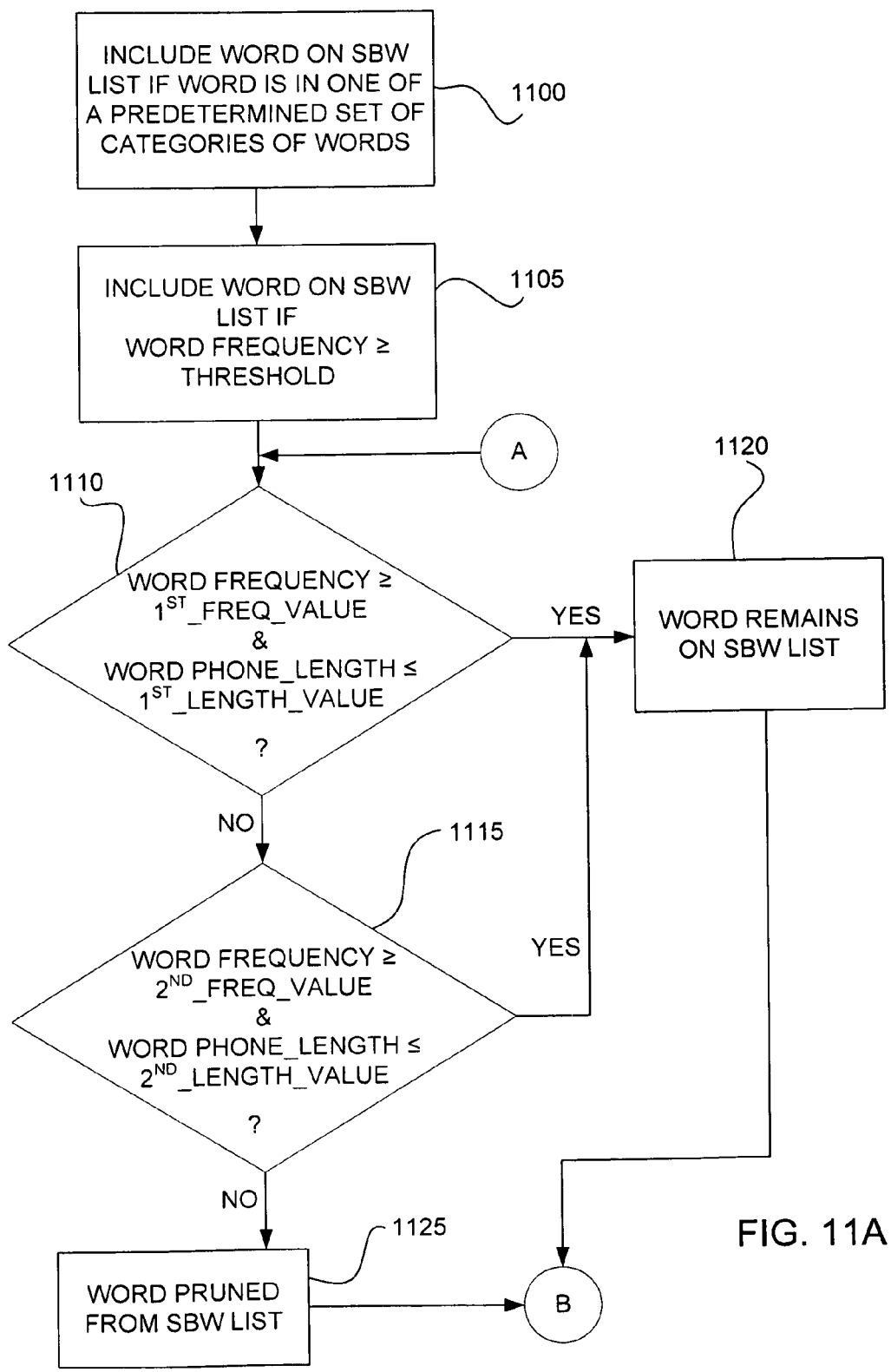
FIGS. 11A and 11B illustrate an embodiment logic flow for a methodology for building an embodiment subset blocking word list.
Figure 11B:
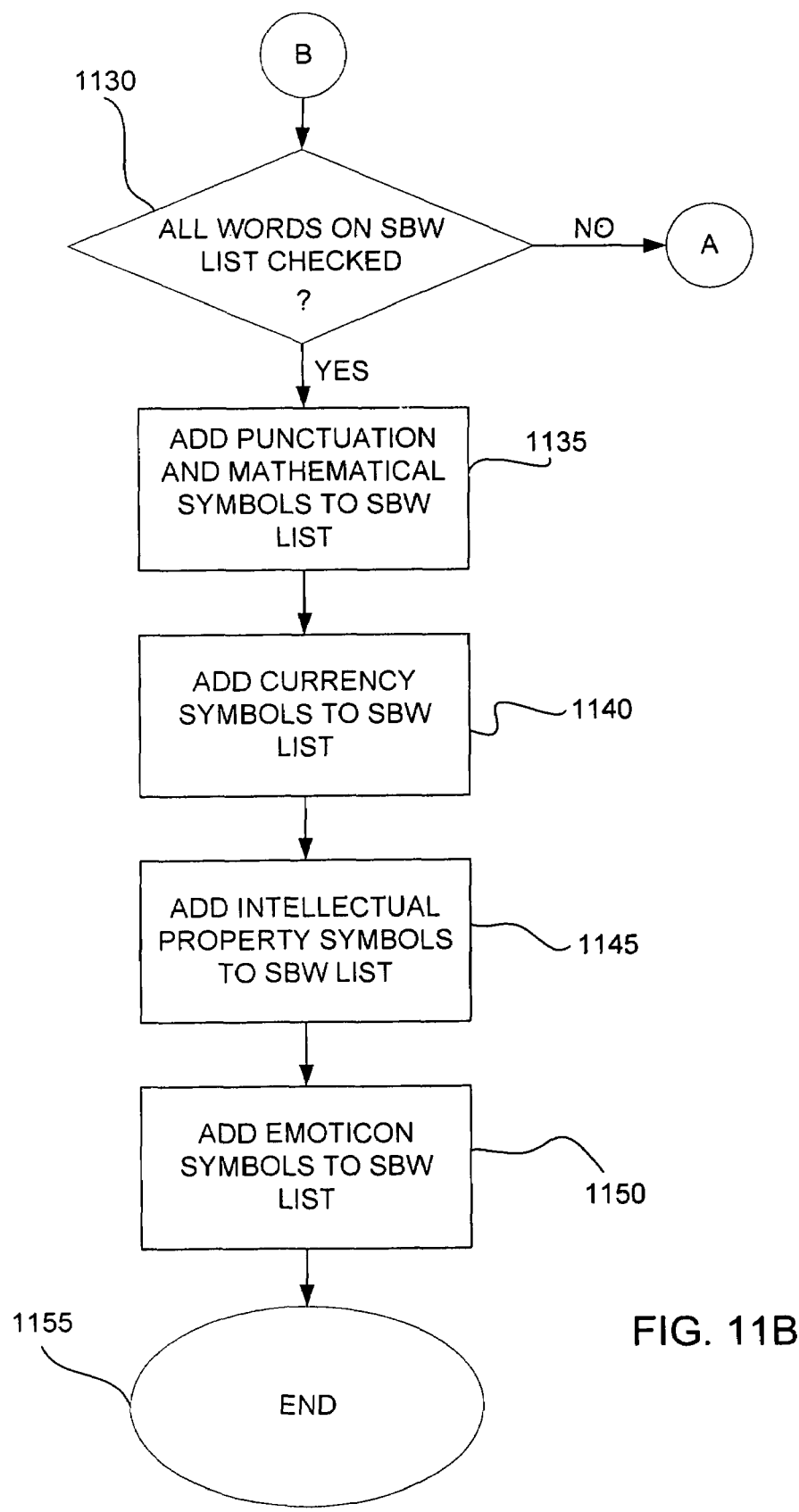

FIGS. 11A and 11B illustrate an embodiment logic flow for a methodology for creating an embodiment SBW list 165. While the following discussion is made with respect to systems portrayed herein, the operations described may be implemented in other systems. Further, the operations described herein are not limited to the order shown. Additionally, in other alternative embodiments more or fewer operations may be performed.

In FIG. 11A the intelligent speech recognition system includes words of predetermined categories and the letters of the language of the commands supported by the system to an SBW list 1100. In an embodiment the categories of words added to the SBW list 1100 include determiners, prepositions, conjunctions, adverbs, interjections, auxiliary verbs and separators. In alternative embodiments, more, less and/or other categories of words are added to the SBW list 1100. In alternative embodiments letters are not included on the SBW list 1100.

In an embodiment the intelligent speech recognition system includes words on the SBW list if their frequency of use in the language of the commands supported by the system is equal to or greater than a predetermined threshold 1105. In an embodiment the threshold value is set so that the one-hundred (100) most frequently used words in the command language are included on the SBW list. In alternative embodiments the threshold value is set so that more or less most frequently used words in the language of the commands supported by the intelligent speech recognition system are included on the SBW list.

At decision block 1110 a determination is made as to whether the frequency of a word or a letter on the SBW list is greater than or equal to a first frequency threshold value and whether the phonemic length of the word or letter is less than or equal to a first length threshold value. If yes, the word or letter is maintained on the SBW list 1120.

In an embodiment the first frequency threshold value is negative four (−4) and the first length threshold value is four (4). Alternative embodiments have a different first frequency threshold value and/or a different first length threshold value.

If the word or letter of the SBW list does not meet the criteria of decision block 1110, at decision block 1115 a determination is made as to whether the frequency of the word or letter on the SBW list is greater than or equal to a second frequency threshold value and whether the phonemic length for the word or letter is less than or equal to a second length threshold value. If yes, the word, or letter, is maintained on the SBW list 1120. Otherwise, if the word or letter of the SBW list does not meet the criteria of decision block 1115, the word or letter is pruned, or otherwise removed, ignored or deleted, from the SBW list 1125.

In an embodiment the second frequency threshold value is negative seven (−7) and the second length threshold value is three (3). Alternative embodiments have a different second frequency threshold value and/or a different second length threshold value.

At decision block 1130 of FIG. 11B a determination is made as to whether all the words and letters on the SBW list have been checked to ensure their frequency of use and phonemic length values meet predefined criteria. If no, as shown in FIG. 11A a determination is made as to whether the frequency of use of the next word or letter on the SBW list is greater than or equal to a first frequency threshold value and whether the phonemic length for the word or letter is less than or equal to a first length threshold value 1110.

Otherwise, if all words and letters on the SBW list have been checked to ensure their frequency of use and phonemic length values meet predefined criteria, in an embodiment the intelligent speech recognition system adds punctuation and mathematical symbols to the SBW list 1135. Exemplary punctuation added to the SBW list 1135 includes, but is not limited to, the period (.), the comma (,), the exclamation point (!) and the question mark (?). Exemplary mathematical symbols added to the SBW list 1135 include, but are not limited to, minus, or minus sign (−), plus, or plus sign (+), equal, or equal sign (=), and percentage, or percent sign (%).

In an embodiment currency symbols are added to the SBW list 1140. Exemplary currency symbols include, but are not limited to, dollar ($) and cents (¢).

In an embodiment intellectual property symbols are added to the SBW list 1145. Exemplary intellectual property symbols include, but are not limited to, trademark (™) and registered (®).

In an embodiment emoticon symbols are added to the SBW list 1150. Exemplary emoticons include, but are not limited to, the smiley face (☺) and the frown face (☹).

In an embodiment, once punctuation and the symbols of one or more categories are added to the SBW list, the SBW list is complete 1155.

In an embodiment the SRE 150 of the intelligent speech recognition system 100 generates the SBW list 165. In alternative embodiments other components or combination of components of the intelligent speech recognition system 100 generate the SBW list 165. In still other alternative embodiments the SBW list 165 is generated and then transmitted or otherwise provided or made accessible to the intelligent speech recognition system 100.

Computing Device System Configuration

Figure 12:
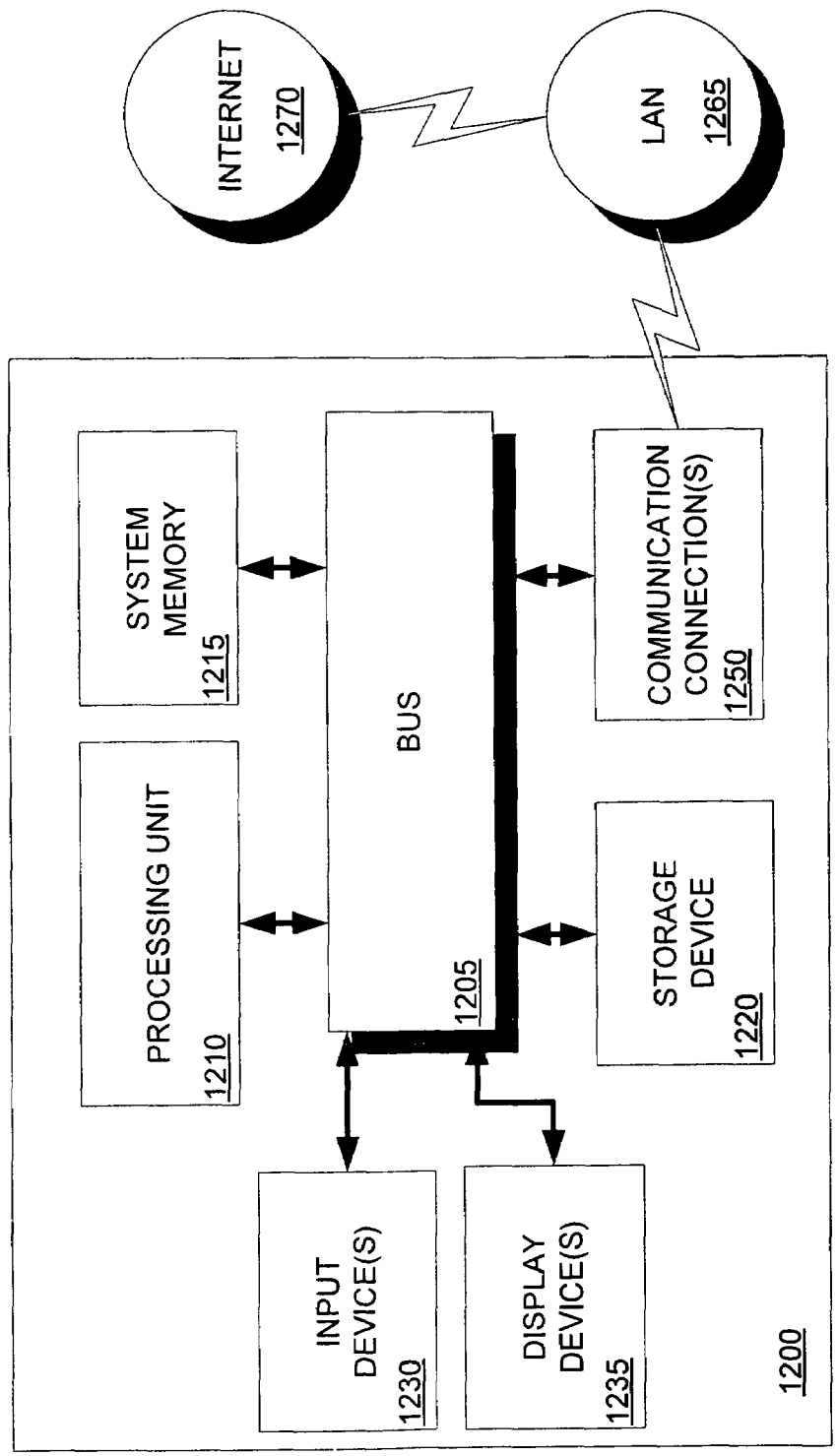
FIG. 12 is a block diagram of an exemplary basic computing device system that can process software, i.e., program code, or instructions.

FIG. 12 is a block diagram that illustrates an exemplary computing device system 1200 upon which an embodiment can be implemented. The computing device system 1200 includes a bus 1205 or other mechanism for communicating information, and a processing unit 1210 coupled with the bus 1205 for processing information. The computing device system 1200 also includes system memory 1215, which may be volatile or dynamic, such as random access memory (RAM), non-volatile or static, such as read-only memory (ROM) or flash memory, or some combination of the two. The system memory 1215 is coupled to the bus 1205 for storing information and instructions to be executed by the processing unit 1210, and may also be used for storing temporary variables or other intermediate information during the execution of instructions by the processing unit 1210. The system memory 1215 often contains an operating system and one or more programs, and may also include program data.

In an embodiment, a storage device 1220, such as a magnetic or optical disk, is also coupled to the bus 1205 for storing information, including program code comprising instructions and/or data.

The computing device system 1200 generally includes one or more display devices 1235, such as, but not limited to, a display screen, e.g., a cathode ray tube (CRT) or liquid crystal display (LCD), a printer, and one or more speakers, for providing information to a computing device user. The computing device system 1200 also generally includes one or more input devices 1230, such as, but not limited to, a keyboard, mouse, trackball, pen, voice input device(s), and touch input devices, which a computing device user can utilize to communicate information and command selections to the processing unit 1210. All of these devices are known in the art and need not be discussed at length here.

The processing unit 1210 executes one or more subsequences of one or more program instructions contained in the system memory 1215. These instructions may be read into the system memory 1215 from another computing device-readable medium, including, but not limited to, the storage device 1220. In alternative embodiments, hard-wired circuitry may be used in place of or in combination with software program instructions. Thus, the computing device system environment is not limited to any specific combination of hardware circuitry and software.

The term "computing device-readable medium" as used herein refers to any medium that can participate in providing program instructions to the processing unit 1210 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 1215 and storage device 1220 of the computing device system 1200 are further examples of storage media. Examples of transmission media include, but are not limited to, wired media such as coaxial cable(s) and copper wire, and wireless media such as fiber optic signals, acoustic signals, RF signals and infrared signals.

The computing device system 1200 also includes one or more communication connections 1250 coupled to the bus 1205. The communication connection(s) 1250 provide a two-way data communication coupling from the computing device system 1200 to other computing devices on a local area network (LAN) 1265 and/or wide area network (WAN), including the World Wide Web, or Internet 1270. Examples of the communication connection(s) 1250 include, but are not limited to, an integrated services digital network (ISDN) card, modem, LAN card, and any device capable of sending and receiving electrical, electromagnetic, optical, acoustic, RF or infrared signals.

Communications received by the computing device system 1200 can include program instructions and program data. The program instructions received by the computing device system 1200 may be executed by the processing unit 1210 as they are received, and/or stored in the storage device 1220 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for identifying verbal phrases, the method comprising:
    defining, using a processing unit, a context free grammar for an application command of an application, the context free grammar identifying at least one valid subset for the application command, the defining comprising applying a subsequence option to a first portion of the application command to generate a first portion of a valid subset for the first portion of the application command and applying an ordered subset option to a second portion, different than the first portion, of the same application command to generate a second portion of the valid subset for the second portion of the application command, the subsequence option specifying acceptable utterances as comprising one or more command words of the application command in consecutive order with no missing interim command words, the ordered subset option specifying acceptable utterances as comprising one or more command words of the application command in order.

2. The method for identifying verbal phrases of claim 1, comprising:
    generating a subset blocking word list that comprises at least one subset blocking word that is not valid within the at least one valid subset of the context free grammar.

3. The method for identifying verbal phrases of claim 2, comprising:
    selectively allowing at least one subset blocking word within the subset blocking word list to be valid within the at least one valid subset of the context free grammar.

4. The method for identifying verbal phrases of claim 1, comprising:
    receiving a verbal phrase from a computing device user;
    generating a recognition for the verbal phrase using the context free grammar;
    associating the recognition with the application command; and
    providing the application command to the application for processing.

5. The method for identifying verbal phrases of claim 4, the application command being a first application command, the method comprising:
    defining a context free grammar for a second application command of the application, the context free grammar for the second application command identifying at least one valid subset for the second application command;
    generating a second recognition for the verbal phrase using the context free grammar for the second application command;
    associating the second recognition with the second application command;
    assigning a score to the first recognition based upon a likelihood of correctness of the first recognition;
    assigning a score to the second recognition based upon a likelihood of correctness of the first recognition; and
    providing the first application command to the application for processing if the score assigned to the first recognition is higher than the score assigned to the second recognition, else providing the second application command to the application for processing.

6. The method for identifying verbal phrases of claim 5, one context free grammar identifying the at least one valid subset for the first application command and the at least one valid subset for the second application command.

7. The method for identifying verbal phrases of claim 1, respective valid subsets of the at least one valid subset identified by the context free grammar for the application command having at least one non subset blocking word.

8. The method for identifying verbal phrases of claim 1, one or more valid subsets of the at least one valid subset for the application command being a subsequence for the application command, one of the at least one valid subset for the application command being the application command.

9. A computer storage device comprising computer executable instructions that when executed via a processor on a computer perform a method for identifying incomplete verbal commands, the method comprising:
    defining a context free grammar for an application command of an application, the context free grammar identifying at least one valid subset for the application command, the defining comprising applying a subsequence option to a first portion of the application command to generate a first portion of a valid subset for the first portion of the application command and applying an ordered subset option to a second portion, different than the first portion, of the same application command to generate a second portion of the valid subset for the second portion of the application command, the subsequence option specifying acceptable utterances as comprising one or more command words of the application command in consecutive order with no missing interim command words, the ordered subset option specifying acceptable utterances as comprising one or more command words of the application command in order.

10. The method for identifying incomplete verbal commands of claim 9, comprising:
    receiving an incomplete verbal command from a computing device user;
    using the incomplete verbal command and the context free grammar to generate a recognition for the incomplete verbal command; and
    identifying the recognition with the application command.

11. The method for identifying incomplete verbal commands of claim 10, the application command being a first application command, comprising:
    defining a context free grammar for a second application command of the application, the context free grammar for the second application command identifying at least one valid subset for the second application command;
    using the incomplete verbal command and the context free grammar for the second application command to generate a second recognition for the incomplete verbal command; and
    requesting the computing device user identify the first application command or the second application command as the command intended by the incomplete verbal command.

12. The method for identifying incomplete verbal commands of claim 10, the application command being a first application command, comprising defining a context free grammar for a second application command, the second application command parsed into at least two application command phrases which are a subsequence of the second application command, and respective command phrases of the at least two application command phrases are defined by a context free grammar that identifies a valid subset for the application command phrase.

13. The method for identifying incomplete verbal commands of claim 12, the recognition identified with the first application command being a first recognition, and a second recognition being identified with the second application command when phrases of the incomplete verbal command match a valid subset identified for the respective application command phrases of the second application command.

14. The method for identifying incomplete verbal commands of claim 9, comprising:
generating a subset blocking word list that comprises at least one subset blocking word.

15. The method for identifying incomplete verbal commands of claim 14, the generating a subset blocking word list comprising including a word or phrase in the subset blocking word list for a punctuation mark.

16. A method for identifying verbal commands, the method comprising:
defining a first context free grammar for a first application command of a first application, the first context free grammar identifying at least one valid subset for the first application command, defining the first context free grammar comprising applying a subsequence option to a first portion of the first application command to generate a first portion of a valid subset for the first portion of the first application command and applying an orderedsubset option to a second portion, different than the first portion, of the first application command to generate a second portion of the valid subset for the second portion of the first application command; and
defining a second context free grammar for a second application command of a second application, the second context free grammar identifying at least one valid subset for the second application command, defining the second context free grammar comprising applying a subsequence option to a first portion of the second application command to generate a first portion of a valid subset for the first portion of the second application command and applying an orderedsubset option to a second portion, different than the first portion, of the second application command to generate a second portion of the valid subset for the second portion of the second application command, the subsequence option specifying acceptable utterances as comprising one or more command words of an application command in consecutive order with no missing interim command words, the ordered subset option specifying acceptable utterances as comprising one or more command words of the application command in order,
at least some of at least one of defining the first context free grammar and defining the second context free grammar implemented at least in part via a processing unit.

17. The method for identifying verbal commands of claim 16, comprising:
receiving a verbal command from a computing device user;
generating a first recognition for the verbal command using the verbal command and the first context free grammar for the first application command;
identifying the recognition with the first application command;
generating a second recognition for the verbal command using the verbal command and the second context free grammar for the second application command;
identifying the second recognition with the second application command; and
determining that the verbal command from the computing device user was intended to identify the first application command.

18. The method for identifying verbal commands of claim 17, the determining that the verbal command from the computing device user was intended to identify the first application command comprising requesting the computing device user to choose between the first application command and the second application command.

19. The method for identifying verbal commands of claim 17, comprising providing the first application command to the application for processing if a likelihood of correctness score assigned to the first recognition is higher than a likelihood of correctness score assigned to the second recognition, else providing the second application command to the application for processing.

20. The method for identifying verbal commands of claim 16, comprising:
generating a subset blocking word list that comprises at least one subset blocking word that is not valid within the at least one valid subset of the first context free grammar for the first application command and that is not valid within the at least one valid subset of the second context free grammar for the second application command.

* * * * *

UNITED STATES PATENT AND TRADEMARK OFFICE
CERTIFICATE OF CORRECTION

| | | |
|---|---|---|
| PATENT NO. | : 7,949,536 B2 | Page 1 of 1 |
| APPLICATION NO. | : 11/513772 | |
| DATED | : May 24, 2011 | |
| INVENTOR(S) | : David Mowatt et al. | |

It is certified that error appears in the above-identified patent and that said Letters Patent is hereby corrected as shown below:

In column 31, line 26, in Claim 1, delete "ordered subset" and insert -- orderedsubset --, therefor.

In column 31, lines 33-34, in Claim 1, delete "ordered subset" and insert -- orderedsubset --, therefor.

In column 32, line 35, in Claim 9, delete "ordered subset" and insert -- orderedsubset --, therefor.

In column 32, line 42, in Claim 9, delete "ordered subset" and insert -- orderedsubset --, therefor.

In column 34, line 6, in Claim 16, delete "ordered subset" and insert -- orderedsubset --, therefor.

Signed and Sealed this
Twelfth Day of July, 2011

David J. Kappos
*Director of the United States Patent and Trademark Office*